(12) United States Patent
Shkedy

(10) Patent No.: US 6,236,972 B1
(45) Date of Patent: May 22, 2001

(54) METHOD AND APPARATUS FOR FACILITATING TRANSACTIONS ON A COMMERCIAL NETWORK SYSTEM

(76) Inventor: Gary Shkedy, 455 E. 86th St., Apt. 22A, New York, NY (US) 10028

( * ) Notice: Subject to any disclaimer, the term of this patent is extended or adjusted under 35 U.S.C. 154(b) by 0 days.

(21) Appl. No.: 09/217,663

(22) Filed: Dec. 21, 1998

Related U.S. Application Data

(63) Continuation-in-part of application No. 09/203,843, filed on Dec. 2, 1998.

(51) Int. Cl.$^7$ .................................................. G06F 17/60
(52) U.S. Cl. .................. 705/1; 705/26; 705/27; 705/37; 705/75; 705/77; 705/80; 380/25
(58) Field of Search ..................... 705/1, 26, 37, 705/75, 77, 80; 713/173, 186; 340/825.31, 825.34; 380/25

(56) References Cited

U.S. PATENT DOCUMENTS

| | | |
|---|---|---|
| 4,903,201 | 2/1990 | Wagner . |
| 5,191,613 | 3/1993 | Graziano et al. . |
| 5,262,942 * | 11/1993 | Earle ........................ 705/37 |
| 5,784,696 * | 7/1998 | Melnikoff ..................... 705/36 |
| 5,794,207 | 8/1998 | Walker et al. . |
| 5,855,008 * | 12/1998 | Golhaber et al. ............... 705/14 |
| 5,983,204 * | 11/1999 | Debe ......................... 705/36 |

FOREIGN PATENT DOCUMENTS

06092080 * 4/1994 (JP) .

OTHER PUBLICATIONS

Steinke Steve, What can E–money do for me?, Network, pp. 1–5, Dec. 1997.*
Prpprietary UPS EDI system could put customers in a bind, EDI News, pp 1–2, Aug. 1997.*
Marketing London, Market research, pp 1–3, Feb. 1996.*
Avoidable cost: The american Economic Review, pp 1–5, Jun. 1996.*

* cited by examiner

*Primary Examiner*—James P. Trammell
*Assistant Examiner*—Mussie Tesfamariam

(57) ABSTRACT

A method and device for using a computer to facilitate a transaction of secondary market shares of an investment company such as a mutual fund between a buyer and a seller, having the steps of: a customer determining the mutual fund to be traded receiving a schedule of fees from the central controller, the customer selecting the class of shares and inputting the quantity to be traded, the customer selecting the order type and adding any special instructions. The customer then submits the order to the central controller. The central controller will match buyers and sellers and determine which orders were executed. For all executions, the central controller will provide the seller with payments and the buyer with shares in the selected mutual fund.

29 Claims, 17 Drawing Sheets

METHOD AND APPARATUS FOR FACILITATING TRANSACTIONS ON A COMMERCIAL NETWORK SYSTEM

Continuation Application Data

The present application is a Continuation-in-part of application Ser. No. 09/203,843, filed by the same inventor on Dec. 2, 1998, the disclosure of which is incorporated-by-reference herein.

BACKGROUND OF THE INVENTION

1. Field of the Invention

The present invention relates to a method and an apparatus for facilitating transactions on a commercial network system and specifically a method and system for facilitating secondary trading of shares of an investment company such as an open-ended mutual fund or a hedge fund.

2. Discussion of Prior Art

An investment company pools money from shareholders and invests in a diversified portfolio of securities. Investment companies are generally known as mutual funds, hedge funds etc. According to the Investment Company Institute an estimated 66 million Americans invested a total of $4.49 trillion in mutual funds at the end of 1997.

An investor in a mutual find is a shareholder who buys shares of the find. Each share represents proportionate ownership in all the fund's underlying securities. The securities are selected by a professional investment advisor to meet the specific financial goals of the fund.

Fund managers typically invest in a variety of securities, seeking portfolio diversification. Mutual funds provide an economic way for the average investor to obtain the same kind of professional money management and diversification of investments that are available to large institutions and wealthy investors.

There are more than 6,700 mutual funds representing a wide variety of investment objectives. The selection of funds has increased over the years in order to meet consumer demand for fund products that help meet a variety of financial objectives.

Mutual funds are required by law to determine the price of their shares each business day. A fund's net asset value (NAV) per share is the current value of all the fund's assets, minus liabilities, divided by the total number of shares outstanding.

A fund's share price, or offering price, is its NAV per share plus any applicable front-end sales charge. The NAV must reflect the current market value of the fund's securities, as long as market quotations for those securities are readily available. Other assets should be priced at fair value, determined in good faith by a funds board of directors. The Investment Company Act of 1940 requires forward pricing i.e. shareholders purchasing or redeeming shares receive the next computed share price following the fund's receipt of the transaction order. Any expenses (including any fees) must be accrued through the date the share price is calculated. Changes in holdings and in the number of shares must be reflected no later than the first calculation of the share price on the next business day.

Mutual fund shares are easy to buy. Investors may purchase fund shares either through a broker, a dealer, a bank representative, insurance agent or directly from the fund. Investment professionals who provide services to investors are usually compensated for those services. This usually occurs through sales commissions, or through 12b-1 and/or service fees deducted form the fund's assets.

Direct-marketed funds are sold through the mail, by telephone, or at office locations. They typically offer funds shares to the public with low sales charge or none at all. Funds that do not charge a sales charge are known as "no-load" funds.

Mutual fund fees and expenses are divided into two areas i.e. transaction expenses and annual operating expenses. Shareholder transaction expenses are fees charged directly to the investor's account for a specific transaction. A front-end sales charge or "load" may be attached to the purchase of the mutual fund shares. This fee compensates a financial professional for his services. Under present law, this charge may not exceed 8.5% of the investment, although most funds charge less than the maximum.

A contingent deferred sales charge, imposed at the time of redemption, is an alternative way to compensate financial professionals for their services. This fee typically applies for the first few years of ownership and then disappears.

A redemption fee is another type of back-end charge for redeeming shares. It is expressed as a dollar amount or as a percentage of the redemption price.

An exchange fee is the fee that may be charged when transferring money from one fund to another within the same fund family.

An account maintenance fee is charged to maintain low-balance accounts.

Annual operating expenses reflect the normal costs of operating the fund. Unlike transaction fees, these expenses are not charged directly to an investor account, but are deducted from the fund's assets before earnings are distributed to shareholders. There are normally two kinds of operating expenses.

(1) Management fees, which are ongoing fees charged by the fund's investment advisor for managing the fund and selecting its portfolio of securities.
(2) 12b-1 fees, which are deducted from the finds assets to pay marketing and advertising expenses, or, more commonly, to compensate sales professionals. Under present law, 12b-1 fees cannot exceed 1% of the fund's average net assets per year.

Mutual funds sometimes offer different classes of shares, such as Class A, Class B and Class C. Share classes represent ownership in the same mutual fund. The way an individual pays for the fund depends on the share class they own. This allows an investor to choose the sales charge that best suits their investment needs and preferences.

Class A shares generally have a front-end sales charge. Class B shares often have a 12b-1 fee and a deferred sales charge if they are sold before a certain number of years. Class C shares charge a higher 12b-1 fee but no front-end or back-end load.

The sale of mutual funds normally occurs the same way as purchases are accomplished. However, as noted above depending on the class of shares an investor holds, the price he receives will depend on the holding period and the back-end sales charge.

At present, mutual fund shares can only be sold (redeemed) back to the same mutual fund. If a mutual fund shareholder could find another investor who wished to purchase shares in the same mutual fund, the shareholder avoids the back-end charges and would receive more money than he would receive from redeeming the fund. The investor avoids upfront charges and would be able to buy the shares cheaper than he could from the mutual fund. This is a clear case of win-win for both the shareholder and the investor.

On the other hand, there are hedge funds that require an investor to commit his capital to the fund for a period ranging from one year to ten years. If for some unforeseen reason, an investor wanted to redeem his shares in the hedge fund before the lock out period ended, a secondary market would enable him to sell the shares to another investor and thus effectively bypass the restriction.

Secondary market trading is also applicable to derivatives on shares of investment companies. No derivatives on shares of investment companies exist at present because there is no secondary market in the shares of these investment companies. Therefore, the transaction cost of hedging these derivatives is prohibitive. The creation of a secondary market in shares of investment companies creates trading on derivatives of these shares as well.

Despite recent advances in computers and electronic network technology and the explosive growth in electronic commerce (e-commerce), applicant is not aware of a commercially viable secondary market in shares of investment companies such as mutual funds or hedge funds wherein buyers and sellers transfer shares of mutual funds to each other.

One element in achieving a viable e-commerce facility for transacting secondary market investment company shares is the ability to authenticate the identity of buyers and sellers. This is vital since the transfer of shares usually is fraught with fraud. Indeed, authentication systems have been developed to ensure the enforceability of electronic contracts. One such method is disclosed in U.S. Pat No. 5,191,613. That system utilizes, among other techniques, digital signatures to authenticate electronic contracts.

Moreover a secondary market for mutual funds which authenticates and binds sellers to the terms of their offers will be more likely to attract the attention of potential buyers, because they are assured of the legitimacy of the offer.

There is also a need for a third party to administer such a secondary market for mutual funds. The third party can administer an Internet site where sellers can advertise their shares for sale. Also, this third party can act as an agent for all the buyers and sellers and allow them to achieve pricing that was previously unattainable. Also, by maintaining a central site for the sale of shares, it makes it easy for buyers to search for offers to buy.

The applicant is unaware of the existence of any commercially viable secondary market for mutual funds, which contains the above features and addresses the above-described shortcomings in the prior art. Therefore, it is one object of the present invention to provide a method and a system for facilitating a secondary market for mutual funds that offers the capability for individual sellers to sell their shares at a higher price than they could redeem them and for buyers to buy those shares at a discount.

Another object of the present invention is to allow an intermediary to bind the seller to the terms of his offer.

Another object of the present invention is to allow an intermediary to bind the buyers to his purchase of the selected shares.

It is another object of the present invention for the intermediary to guarantee payment to the seller, with payment occurring on the settlement date and to guarantee delivery of the shares to the buyer on the settlement date.

It is yet another object of the present invention to allow either buyers or sellers to remain anonymous if they so wish.

A further object of the invention is to provide a system in which the identity of the buyer is authenticated along with the integrity of the buyer's purchase offer.

Another object of the invention is to provide a system in which the identity of the seller is authenticated in order to determine the seller's capacity to satisfy the conditions of his offer.

It is another object of the present invention to allow for purchases of shares that require more than one buyer to combine to fulfil the sales offer.

These and other objects of the invention will he apparent to those skilled in the art from the following detailed description of the invention, the accompanying drawings and the appended claims.

SUMMARY OF THE INVENTION

In one aspect of the invention, a method for using a computer to facilitate a transaction between at least one buyer and at least one seller comprises the steps of: a customer determining the mutual fund to be traded, receiving a schedule of fees from the central controller, the customer selecting the class of shares and inputting the quantity to be traded, the customer selecting the order type and adding any special instructions. The customer then submits the order to the central controller. At the end of the day, the central controller will match buyers and sellers and determine which orders were executed. For all executions, the central controller will provide the seller with payments and the buyer with shares in the selected mutual fund.

The present invention advantageously accomplishes what no previous system has accomplished heretofore, that is to provide individuals with the ability to minimize the transaction fees they pay to trade mutual fund shares. Currently, individuals who do not require the service of professional advisors are still forced to pay transaction fees to compensate them.

These and other objects, features and advantages of the present invention will become apparent from the following detailed description of illustrative embodiments thereof, which is to be read in connection with the accompanying drawings in which the same reference numerals are used throughout the various figures to designate same or similar components.

In another aspect of the invention, a computer based method is provided for facilitating a secondary market transaction in transmitting shares of investment companies between at least one buyer, an intermediate, and a seller, comprising:

receiving at the intermediate a sell order to sell shares of an investment company from the seller transmitting from a remote transmitting device, the intermediate having a central controller including database storage;

assigning a sell tracking identification corresponding to the sell order and the seller;

storing the sell order and sell tracking identification in the database; receiving a buy order from the buyer;

assigning a buy tracking identification corresponding to the buy order and the buyer; storing the buy order and buy tracking identification to the database;

scanning the database for matching sell and buy orders; executing trade upon a match;

forwarding trade confirmation to the transfer agent; and forwarding confirmations of transaction to the buyer and the seller.

Preferably, the buy or sell order further includes a settlement date and a quantity specifier.

The step of authentication of the customer's identification is preferably by comparing the customer s identification with a customer identification stored in the central controller database, or by authenticating the customer's smart card with a smart card issuer. And, the step of authentication of the customer's identification is by cryptographic means such as a symmetric or asymmetric key algorithm including one of DSA, DES, hash protocols and digital signatures, or by biometric means.

The communications between the buyer, intermediary, and the seller is preferably conducted over an electronic network. The investment company is preferably a mutual fund or a hedge fund.

According to another aspect of the invention, a device having stored programs executable by a computer is provided to facilitate transactions of shares of an investment company between a seller, a buyer, and an intermediate; the stored programs causing the computer to execute method. Steps including the steps described above.

DETAILED DESCRIPTION OF PREFERRED EMBODIMENTS

A system and method according to the present invention is provided for facilitating a secondary market for the trading of shares of an investment companies such as mutual funds or hedge funds. The investment companies will be described herein as mutual funds but it should be understood that the invention is applicable for all types of investment companies. The invention provides a global system for matching orders from buyers and sellers who wish to trade shares in the same family of mutual funds. The illustrative method and system according to the present invention provide a bilateral system for creating binding contracts by use of a central controller to field binding orders from buyers and from sellers, match those trades in a manner that achieves a cost saving for both buyers and sellers The illustrative method and system effectuate performance of resulting executions, and settlement procedures, authentication, confidentiality, and anonymity. The system could also be used to display a current list of orders in a particular fund to both buyers and sellers.

Figure 1:
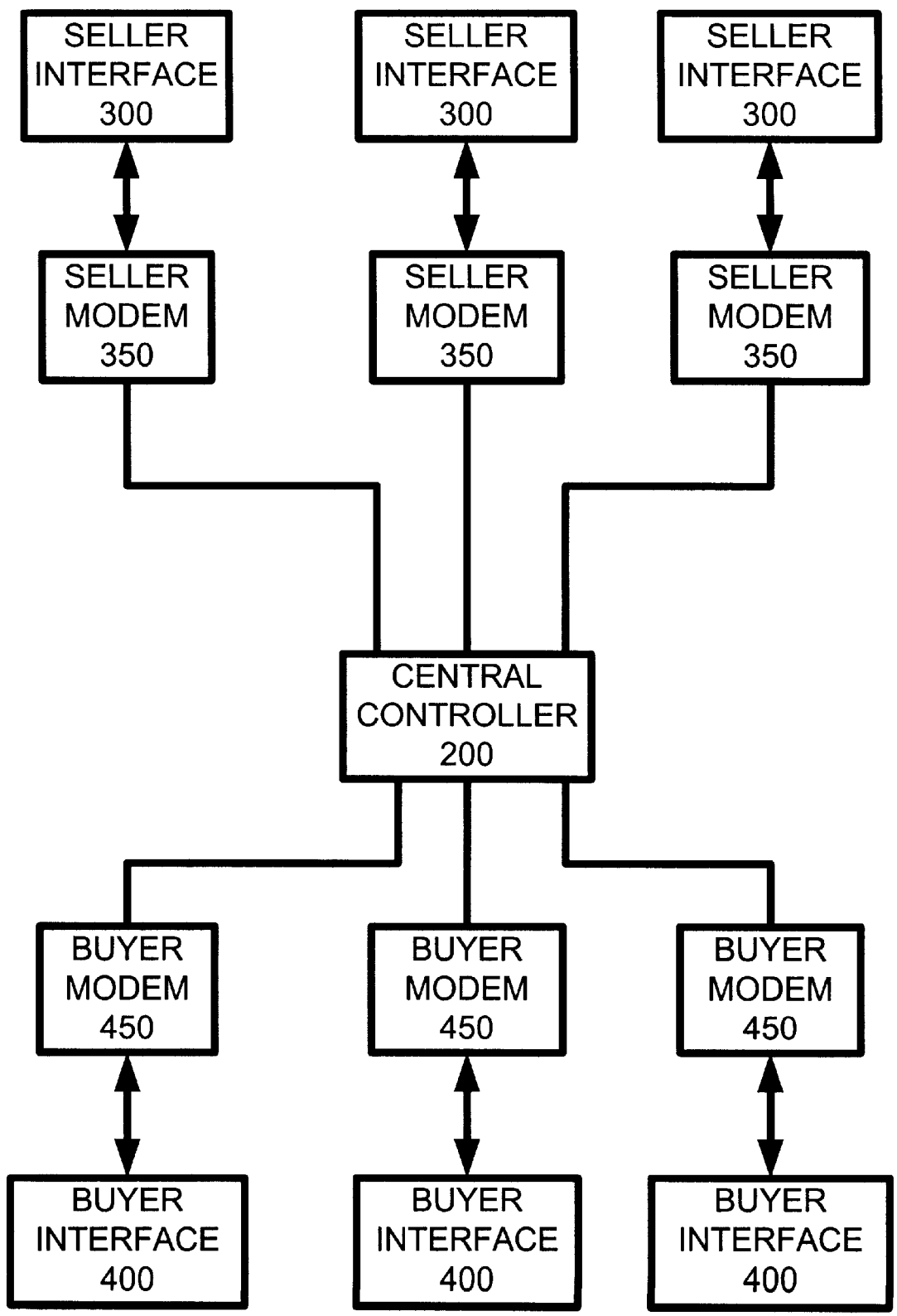
FIG. 1 illustrates a first embodiment of the present invention.

Referring now to FIG. 1, in a preferred embodiment, an electronic network including a central controller 200 is shown. The network facilitates communications between a plurality of buyers and a plurality of sellers through an intermediary (i.e. central controller 200). FIG. 1 illustrates a plurality of buyers electronically coupled to one central controller 200 with buyer modems 450, the central controller 200 is electronically coupled to a plurality of seller through seller modems 350 and seller interface 300. Each of the plurality of buyers who wish to make purchases independently access the central controller 200 to create buying orders. The central controller 200 is preferably located at a remote server, FIG. 2a illustrates the steps associated with the creation, transmission and inclusion of an order 100 into the order database 267. At step 40, a buyer 16 (or seller 20) selects the family of mutual fund he wishes to trade. At step 42, the buyer 16 (or seller 20) then selects the particular mutual fund in the family. At step 44, central controller 200 determines the fee structure for the particular mutual fund, and transmits it to the buyer (or seller). Along with this information, the central controller 200 may add legal language to the order 100 to make it explicit to the buyer 16 (or seller 20) that should the buyer 16 (or seller 20) submit an order he will be entering into a binding agreement. At step 46, the buyer 16 (or seller 20) then adds a quantity specifier along with any other required buyer 16 (or seller 20) specified conditions. At step 48, a buyer 16 (or seller 20) will specify along with the fund and quantity, the buyer 16 (or seller 20) identification data.

Step 50 is a decision step to determine if the customer wishes to do the trade. If he does not, the process then terminates at step 52. Else the process continues at step 54, where prior to submitting the order 100 to the central controller 200, the buyer 16 (or seller 20) attaches his user identification to the order 100 and transmits the order 100 to the central controller 200. The buyer (seller) has now entered into a legally binding agreement to trade the selected mutual fund.

A typical buyer created order, order 100, could, for example, specify that the buyer wishes to purchase $50,000 of the Oppenheimer Limited Term New York Municipal Fund class B shares.

At step 56, before adding the order 100 to the database, the central controller 200 authenticates the buyer's (seller's) identification number against a customer database (not shown but a part of the central controller). The central controller 200 may require that the buyer 16 has sufficient funds in his account to cover the purchase price of the specified mutual. (Similarly, for seller, the central controller may require that the seller has the shares in his account to cover the proposed sale of shares). Once a buyer is authenticated and credit worthy, at step 58, the central controller 200 then assigns a unique tracking number to the order 100, timestamps it and adds it to the order database.

At the end of the day, the central controller will match buyers and sellers and determine which orders will be executed. If there are any trades that cannot be executed, the central controller will notify the customer that their trades did not occur.

In the event that a buyer 16 or a seller 20 is awarded the trade, the central controller 200 will send a confirmation to the buyer 16 and the seller 20. After the execution, the central controller will notify the transfer agent that the trade has occurred. On the settlement date, the central controller will transfer the payment to the seller and the transfer agent will register the shares in the buyer's name.

Under the present invention, communications between the various parties may be transmitted via numerous means including a worldwide-web interface, personal digital assistant (PDA), electronic mail, voice mail, facsimile, or postal mail. Other means not explicitly enumerated herein are also within the scope of the invention.

In another embodiment, the central controller 200 could manage the transfer of shares between the buyer and seller 20 automatically. The central controller would then manage the total client account, which would include cash and securities.

The present invention can also be practiced in off-line embodiments. Instead of using electronic mail or web-based servers, buyer 16s and seller 20s may communicate with the central controller 200 via telephone, facsimile, postal mail, or another off-line communication tool. For example, buyers may use telephones to create order 100s (with or without the assistance of live agents) and potential seller 20s may use a telephone to also create order 100s.

Other embodiments may use cryptographic protocols to authenticate the identity of buyer 16s and/or seller 20s and verify the integrity of buyer 16 and seller 20 communications with the central controller 200. The use of cryptography, smart cards and biometrics can make it significantly more difficult for unauthorized persons to tamper with the system by passing themselves off as legitimate buyer 16s or seller 20s or eavesdropping on system communications.

In another on-line embodiment, either buyer 16 or the seller 20 or the central controller 200 could use intelligent software agents to accomplish all or some of the buyer/seller 20 communications with the central processor. Thus the central processor provides a meeting place for such agents to communicate. The central controller 200 could then create an order corresponding to the instructions of the agent.

In one embodiment of the present invention buyers could indicate a minimum discount off the fee schedule provided by the central controller 200, that a buyer 16 would be willing to accept in order to execute his trade. In this embodiment the seller 20 would also be able to indicate a maximum discount off the fee schedule he was willing to accept in order to have his trade executed.

In another embodiment, the buyer and seller authorization can be split into a multi signing process. This would require that the order 100 be signed by multiple individuals before it can be a legally binding trade. This is especially important for joint accounts, where all parties are required to authorize a trade.

One embodiment of the present invention divides the functionality of the central controller 200 into three components and embodies them in three separate servers: an operations server, a certificate authority, and a settlement server. The certificate authority authenticates the identity of buyer 16s and seller 20s while the settlement server verifies their ability to pay or deliver shares. The operations server posts orders 100 relying upon messages from the other two servers for validation. This configuration allows for greater specialization of the servers.

In one embodiment of the present invention buyers and sellers could indicate a price at which they were willing to trade. This embodiment would correspond to an electronic exchange similar to the NASDAQ. Here investors could trade most likely require a change in the current law, which requires mutual funds to only price their securities once a day. However, if the law was changed, this embodiment would allow for the continuous trading of mutual find shares in a secondary market.

In another embodiment of the present invention the buyers 16 and sellers 20 would specify a hierarchy of share classes and pricing they required. An example would be, I will trade class B shares with 2 years remaining for a 1% discount, if not then class B shares with 3 years remaining for 2% else class C shares for 0.5%. This is extremely useful, for buyers and sellers as all trading is only done at the end of day, and if they are not executed, they would have to wait an additional day to enter their trades. In that instance they would be assuming further market risk Another embodiment of the present invention does not require a transfer of funds from a buyer 16 to a seller 20. Instead, the system may be used to consummate a contract involving an exchange of mutual funds in different fund families.

Finally, an embodiment of the present invention includes a mechanism for resolving disputes between buyers and seller 20s arising out of trades consummated using the system. The parties may be required in orders 100 to stipulate to binding arbitration and may be assisted in the arbitration process by the central controller 200. The central controller 200 may serve as an arbitrator or may refer the dispute to a third-party arbitrator for resolution.

The present invention is a highly effective bilateral secondary market for the trading of mutual funds. The present invention provides numerous unique advantages including reduced fees and anonymity. For numerous privacy reasons, buyer 16s and seller 20s often prefer not to have their identities revealed to the general public when engaging in these transactions. The present invention effectuates the anonymity of buyer 16s and seller 20s through the use of identification numbers stored in a database secured by the central controller 200.

The method and apparatus of the present invention will now be discussed with reference to FIGS. 1, 2, 3 and 4. In a preferred embodiment, the present invention includes central controller 200, seller interface 300, buyer interface 400, and associated databases. The present invention receives orders from buyers and sellers and then matches the trades. A buyer is able to communicate his commitment to the seller through the intermediary. The intermediary is able to communicate the buyer's ability to pay on an order to a seller, giving the seller confidence that if he trades his shares, he will receive payment.

System Architecture

The system architecture of a first embodiment of the apparatus and method of the present invention is illustrated with reference to FIGS. 1 through 4. As shown In FIG. 1, the apparatus of the present invention comprises seller interface 300, central controller 200, and buyer interface 400 (collectively the "nodes"). Each node is connected via an Internet connection using a public switched phone network, such as those provided by a local or regional telephone operating company. Connection may also be provided by dedicated data lines, cellular, Personal Communication Systems ("PCS"), microwave, or satellite networks. Other embodiments may use other means of communication not enumerated herein. Seller interface 300 and buyer interface 400 are the input and output gateways for communications with central controller 200.

Using the above components, the present invention provides a method and apparatus to post orders to trade in mutual funds and then a process to match those trades.

Figure 2:
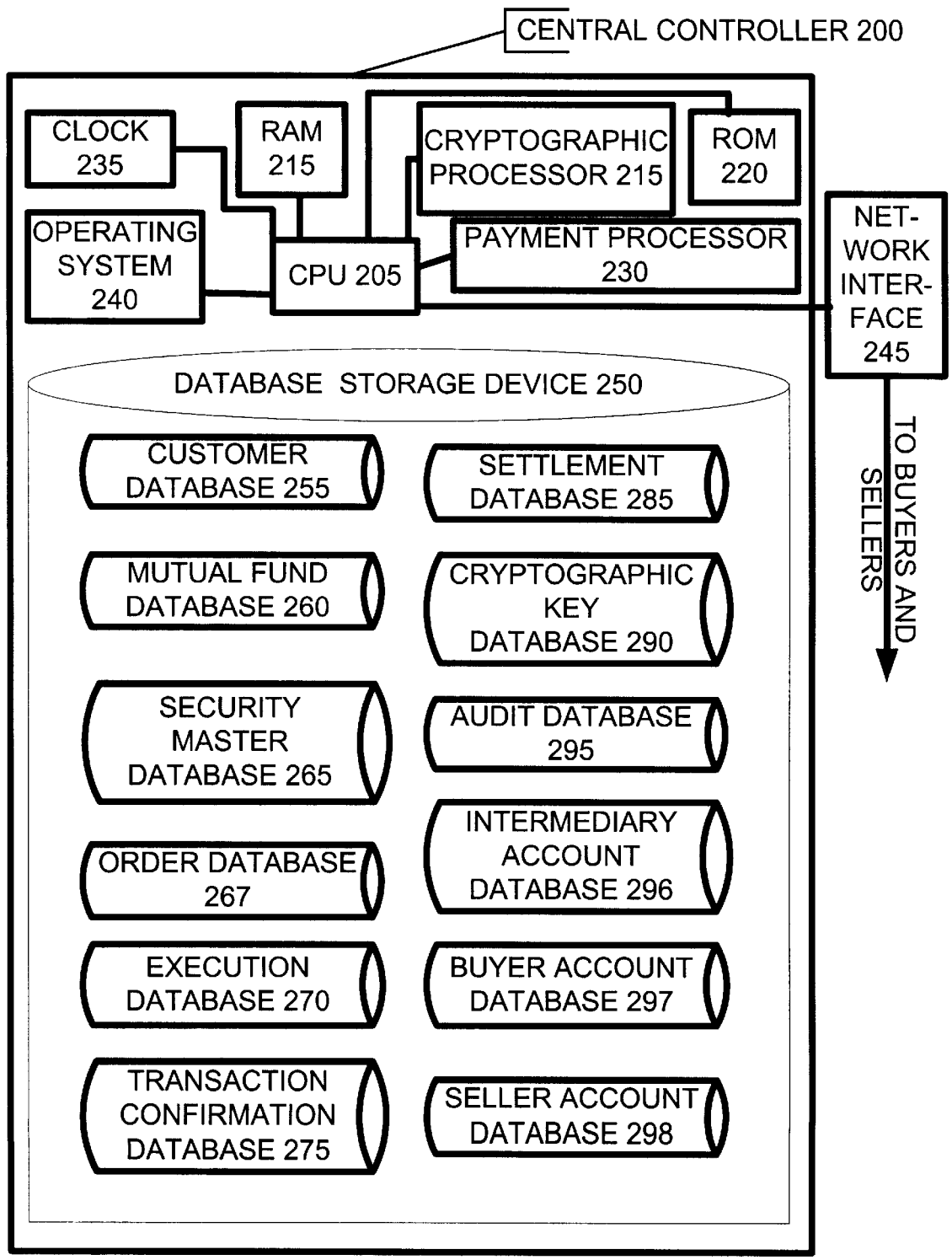
FIG. 2 is a block diagram showing one embodiment of the central controller.
Figure 2A:
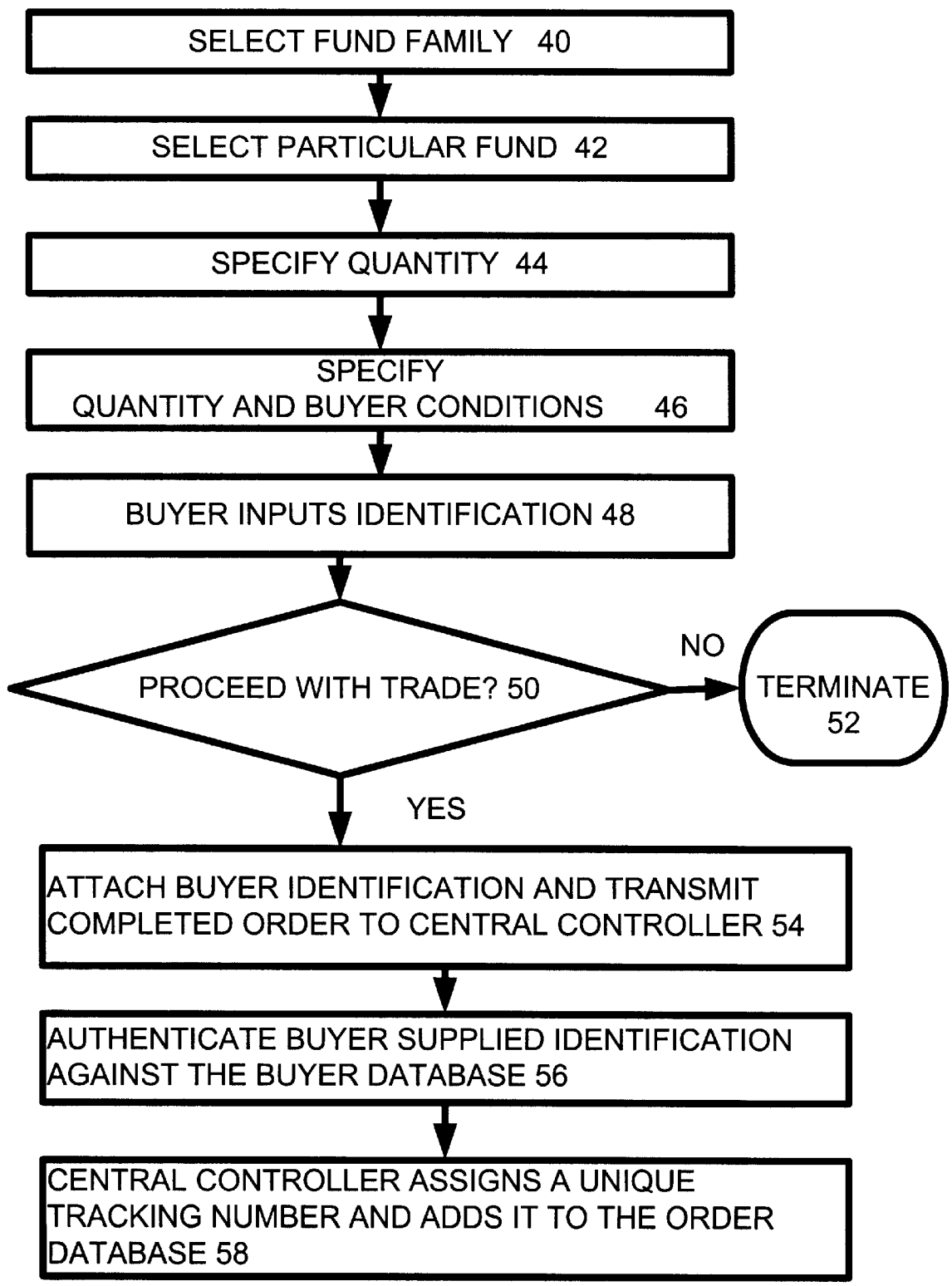
FIG. 2A illustrates an exemplary flow of a transaction.

As shown in FIG. 2, central controller 200 includes central processor (CPU) 205, cryptographic processor 210, RAM 215, ROM 220, payment processor 230, clock 235, operating system 240, network interface 245, and data storage device 250.

A conventional personal computer or computer workstation with sufficient memory and processing capability may be used as central controller 200. In one embodiment it operates as a web server, both receiving orders 100 and transmitting executions 110 generated by buyers and sellers. Central controller 200 must be capable of high volume transaction processing, performing a significant number of mathematical calculations in processing communications and database searches. A microprocessor such as the 450 MHz Pentium II, commonly manufactured by Intel Inc., may he used for CPU 205. This processor employs a 32-bit architecture. Equivalent processors include the Motorola 266 MHz MPC8240 PowerPC or Sun Microsystems 600 MHz UltraSPARC-III.

An MC68HC16 micro-controller, commonly manufactured by Motorola Inc. may he used for cryptographic processor 210. Equivalent processors may also be used. This micro-controller utilizes a 16-bit multiply-and-accumulate instruction in the 16 MHz configuration and requires less than one second to perform a 512-bit NSA private key operation. Cryptographic processor 210 supports the authentication of communications from buyers and sellers, as well as allowing for anonymous transactions. Ideally, cryptographic processor 210 may also be configured as part of CPU 205. Other commercially available specialized cryptographic processors include VLSI Technology's 40 MHz VMS110.

Data storage device 250 may include hard disk magnetic or optical storage units, as well as CD-ROM drives or flash memory. Data storage device 250 contains databases used in the processing of transactions in the present invention. These include customer database 255, mutual fund database 260, security master database 265, order database 267, execution database 270, transaction confirmation database 275, contract detail database 280, settlement database 285, cryptographic key database 290, and audit database 295. In a preferred embodiment database software such as Oracle 8, manufactured by Oracle Corporation, is used to create and manage these databases. Data storage device 250 also stores information pertaining to intermediary account 296, buyer account 297 and seller account 298.

Customer database 255 maintains data on customers with fields such as account type, name, address, telephone number, ID number, social security number, date of birth, citizenship, electronic mail address, smart card ID, public/private key information etc. This information is obtained when the customer first registers with the system, or immediately prior to posting his first order 100. Different information may be required for different account types e.g. a joint account would require two social security numbers etc.

Mutual Fund database 260 maintains data on all the families of funds with fields such as fund ID, fund family name, investor limitations and fund contact information. Contact information comprises a phone numbers, web page URL, telephone number, electronic mail address, voice mail address, facsimile number, or any other way to contact the mutual fund.

Security master database 265 maintains data on all the specific mutual funds that can be traded. It has fields such as fund ID, fund name, description, fund family ID, class of share, fee structure etc. This database is the catalog of mutual funds that can be traded. If necessary this database could also store the prospectus for each fund.

Order database 267 tracks all the order 100s with fields such as status, tracking number, date, time, fund ID, customer ID, buy/sell, order type, quantity, price indicator, and special instructions. The order types would be a selection of kind of orders such as fill or kill (no partial executions allowed), market order, limit order etc. The special instructions would consist of execution requirements such as buy directly from mutual fund if no seller found in secondary market. This database is valuable in the event of disputes between buyers, sellers and the intermediary regarding settlement, because details of the order can be easily be produced.

Execution database 270 tracks all execution 110s with field such as status, date, time, fund ID, order tracking number, quantity, price etc. This database is also valuable in the event of disputes between buyers, sellers and intermediary as it contains all the details of the execution that can be produced on request.

Transaction confirmation database 275 tracks the confirmations sent to the buyer and seller confirming completed transactions. Fields include customer name, customer ID number, confirmation tracking number, execution tracking number and associated order tracking number.

Contract detail database 280 contains form background provisions for inclusion in order 100s. These form provisions effectively fill the gaps between conditions specified by the buyer/seller, specifying the generic contract details common to most order 100s.

Settlement database 285 tracks all payments made by the buyers and share transfers made by sellers with fields such as customer ID number, amount of payment/receipt, number of shares bought/sold and associated execution tracking number.

Cryptographic key database 290 facilitates cryptographic functions, storing both symmetric and asymmetric keys. These keys are used by cryptographic processor 210 for encrypting and decrypting orders 100.

Audit database 295 stores transactional information relating to the accepting of orders 100 and the generation of executions 110, allowing it to be retrieved for later analysis.

Intermediary Account Database 296 tracks all payments made to and by the intermediary. This account may be a pointer to account data stored at the intermediary's bank.

Customer account 297 tracks all information pertaining to the customer's account with fields such as customer ID, bank account numbers, and debit or credit transactions. This account may be a pointer to account data stored at the customer's bank. It could also store all securities held in the customer account.

Network interface 245 is the gateway to communicate with buyers and sellers through respective buyer interface 400 and seller interface 300. Conventional internal or external modems may serve as network interface 245. Network interface 245 supports modems at a range of baud rates from 1200 upward, but may combine such inputs into a TI or T3 line if more bandwidth is required. In a preferred embodiment, network interface 245 is connected with the Internet and/or any of the commercial on-line services such as America Online, IBM Global Network, CompuServe, or Prodigy. This allows buyers and sellers access from a wide range of on-line connections. Several commercial electronic mail servers include the above functionality. Microsoft Exchange Server 5.5 is a secure server-based electronic mail software package designed to link people and information over enterprise networks and the Internet. The product utilizes open standards based on Internet protocols. Users can exchange messages with enclosures such as files, graphics, video and audio. Alternatively, network interface 245 may be configured as a voice mail interface, web site, BBS, or electronic mail address.

While the above embodiment describes a single computer acting, as central controller 200, those skilled in the art will realize that the functionality can be distributed over a plurality of computers. In one embodiment, central controller 200 is configured in a distributed architecture, wherein the databases and processors are housed in separate units or locations. Some controllers perform the primary processing functions and contain at a minimum RAM, ROM, and a general processor. Each of these controllers is attached to a WAN hub, which serves as the primary communication link with the other controllers and interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system. The certificate authority embodiment provides more details of such a distributed environment describing operations server 160, certificate authority 165, and settlement server 170. The hardware of these servers would be configured similarly to that described for central controller 200.

Figure 3:
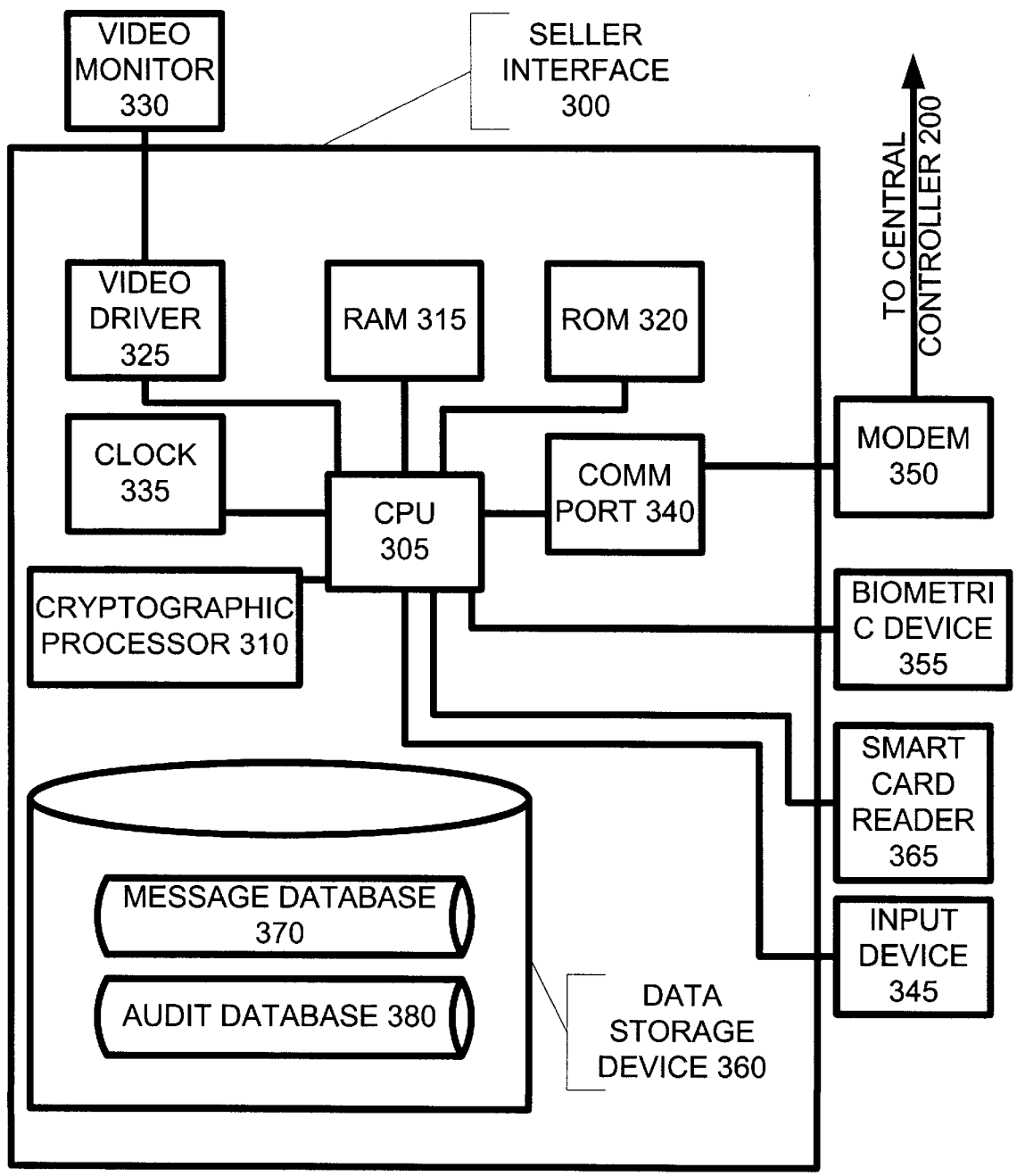
FIG. 3 is a block diagram showing one embodiment of the seller interface.
Figure 4:
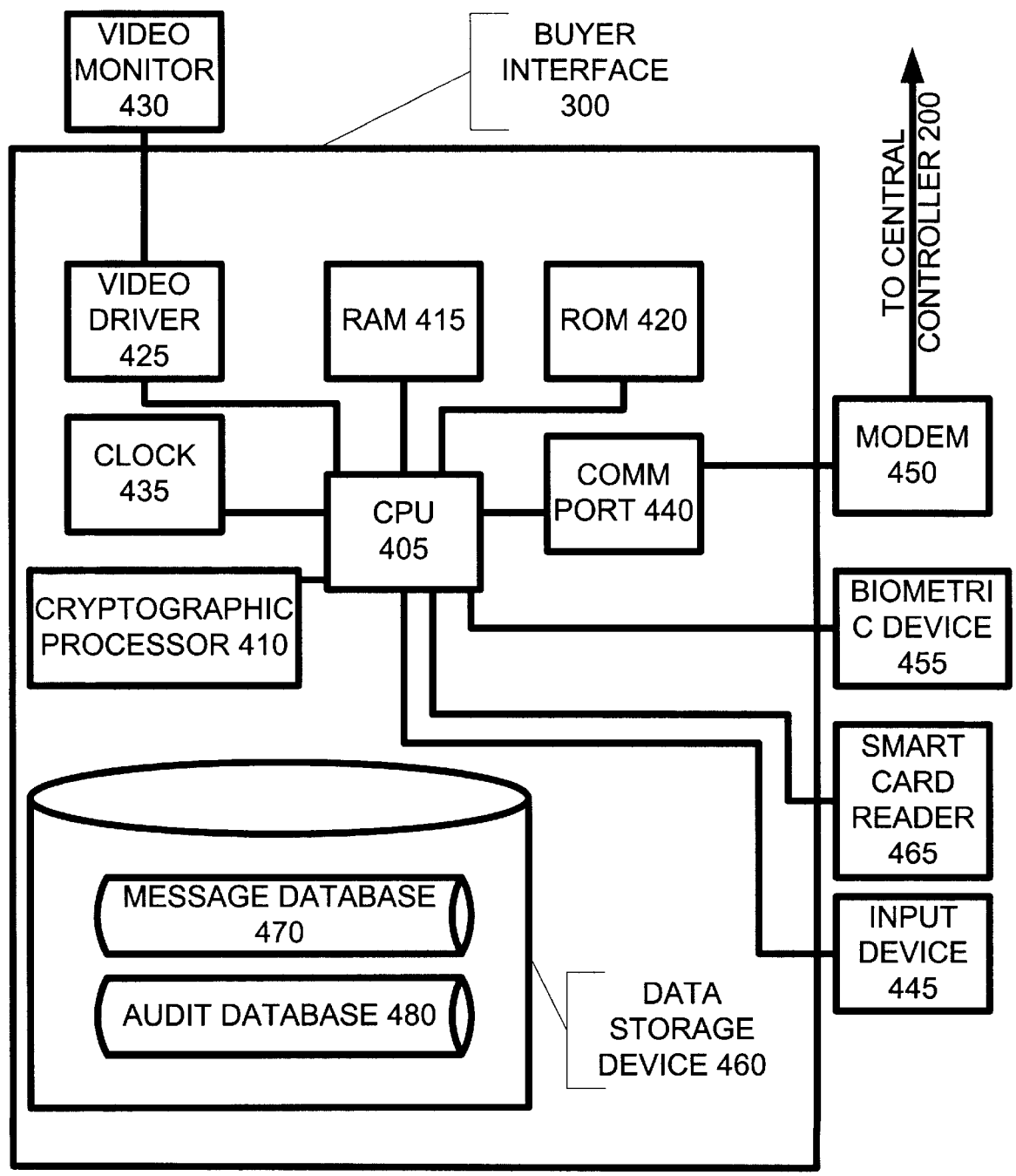
FIG. 4 is a block diagram showing one embodiment of the buyer interface.

FIGS. 3 and 4 describe seller interface 300 and buyer interface 400, respectively. In an exemplary embodiment they are both conventional personal computers having an input device, such as a keyboard, mouse, or conventional voice recognition software package; a display device, such as a video monitor a processing device such as a CPU; and a network interface such as a modem. These devices interface with central controller 200. Alternatively, seller interface 300 and buyer interface 400 may also be voice mail systems, PDAs, or other electronic or voice communications systems. As will be described further in the following embodiments, devices such as fax machines or pagers are also suitable interface devices.

Referring now to FIG. 3, there is described seller interface 300, which includes central processor (CPU) 305, RAM 315, ROM 320, clock 335, video driver 325, video monitor 330, communication port 340, input device 345, modem 350, and data storage device 360. Cryptographic processor 310, smart card reader 365 and biometric device 355 may be added for stronger authentication as described later. A microprocessor such as the 450 MHz Pentium II Processor described above may be used for CPU 305. Clock 335 is a standard chip-based clock, which can serve to timestamp seller bid 119 produced with seller interface 300.

Modem 350 may not require high-speed data transfer if most seller responses 110 produced are text-based and not too long. If a cryptographic processor is required, the MC6SHC16 micro-controller described above is used. The structure of biometric device 355 and smart card reader 365 will be described below in conjunction with the cryptographic authentication embodiment.

Data storage device 360 is a conventional magnetic-based hard disk storage unit such as those manufactured by Conner Peripherals or Maxtor. Message database 370 may be used for archiving seller bids 115, while audit database 380 may be used for recording payment records and communications with central controller 200.

Referring now to FIG. 4, there is described buyer interface 400, which includes central processor (CPU) 405, RAM 415, ROM 420, clock 435, video driver 425, video monitor 430, cryptographic processor 410, smart card reader 465, biometric device 455, communication port 440, input device 445, modem 450, and data storage device 460. All of these components may be identical to those described in FIG.3.

There are many commercial software applications that can enable the communications required by seller interface 300 or buyer Interface 400 the primary functionality being message creation and transmission. Eudora Pro manufactured by Qualcomm Incorporated, for example, provides editing tools for the creation of messages as well as the communications tools to route the message to the appropriate electronic address. When central controller 200 is configured as a web server, conventional communications software such as the Netscape Navigator web browser, from Netscape Corporation or Internet Explorer, from Microsoft may also be used. The buyer and seller may use these browsers to transmit order 100. No proprietary software is required.

Online Embodiment

In one embodiment of the present invention, communications between buyers and sellers take place via electronic networks, with central controller 200 acting as a web server. The buyer logs on to central controller 200, selects the mutual fund he wishes to purchase, accepts the indicated terms given by central controller 200 and thereby creates order 100, and then disconnects from the network. Similarly, the seller logs on to central controller 200, selects the mutual fund he wishes to sell, accepts the indicate terms given by central controller 200, and thereby creates another order 100. At the end of the day, the central controller matches orders to create execution 110. The central controller then notifies the transfer agent of the transaction. The central controller sends a confirmation to both the buyer and the seller. On the settlement date the transfer agent and the central controller automatically transfer the shares and the funds to the corresponding accounts.

Figure 5:
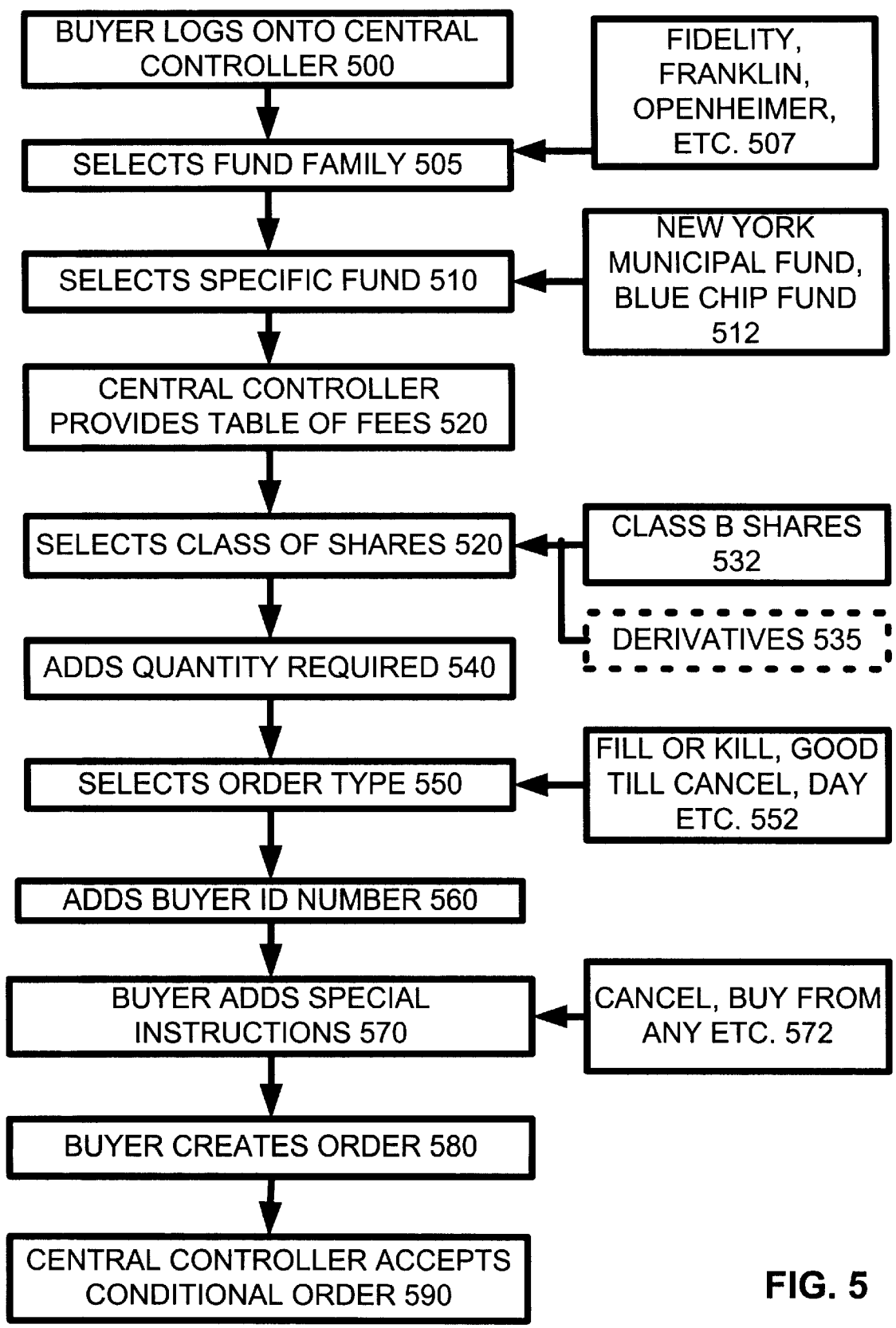
FIG. 5 illustrates an embodiment showing how a buyer order is generated.

With reference to FIG. 5, there is described the process by which the buyer formulates order 100. At step 500, the buyer logs on to central controller 200 using buyer modem 450 of buyer interface 400, establishing a communication link. It should be noted that the buyer might be an individual, a trust, a corporation, a partnership, government or any other entity. In one embodiment, central controller 200 has a page or website on the World Wide Web, allowing the buyer to provide information through the interface of conventional web browser software such as Netscape Navigator, manufactured by Netscape, Inc or Internet Explorer, manufactured by Microsoft. At step 505, the buyer selects the family of funds he wants to purchase by selecting from a list of possible fund families. As shown in box 507 categories might include Fidelity, Oppenheimer, etc. After the family is selected, in step 510 the buyer than selects a particular fund from the family. As shown in box 512, this might be a New York Municipal Fund, A Growth Fund, A Blue Chip Fund etc. At step 520 a form is displayed on video monitor 430 of buyer interface 400 (Note steps 505 and 510 could also be accomplished in the same way). This form is an electronic contract with a table of fees for the selected fund and selection fields and/or a number of blanks to be filled out by the buyer, with each blank representing a condition of order 100. At this step, boilerplate language is added to the order. The legal language is pulled from contract detail database 280, which stores a plurality of paragraphs. These paragraphs are linked together with the above contract elements to form a complete order 100 once the buyer accepts the terms in step 580.

At step 530, the buyer selects the class of shares he wishes to purchase. This would indicate the expected fees he was willing to pay. This selection could be accomplished by using a selection box provided in step 520. At step 540 the buyer enters the quantity he requires and at step 550 he selects the order type. As indicated in box 552 order type, could be Fill or Kill, Good till Cancel, Day etc.

At step 560 the buyer add any special instruction. These instructions indicate if the buyer would like to use the primary market if his order is not matched. As indicated in box 562 he could choose to Cancel the order or Buy in the Primary etc.

At step 570 the buyer attaches his name or a unique user ID number to order 100. This ID number is received from central controller 200 when the customer registers for the service, or is chosen by the customer and then registered with central controller 200 by phone. Central controller 200 maintains a database of customer ID numbers in customer database 255, and issues (or allows) only unique numbers. If less security is required, the user's telephone number or social security number could serve as the ID number since it has the advantages of being both unique and easily remembered. If additional security is required, those procedures described in the cryptographic embodiment may be implemented.

Once the above elements have been developed, the buyer transmits them to central controller 200 at step 580. The buyer does this by clicking on a "send" button located on the screen in which he entered the terms of order 100. At this step the buyer has entered into a binding agreement with the intermediary.

Instead of a World Wide Web based interface, buyers may also transmit order 100 data via other means including electronic mail, PDAs, EDI, voice mail, facsimile, or postal mail transmissions. With voice mail, the buyer calls central controller 200 and leaves order 100 in audio form. These orders 100 may be transcribed into digital text at central controller 200, or maintained in multiple formats. In a postal mail embodiment, central controller 200 acts more like a aggregator, collecting orders 100 and then performing the matching process. Central controller 200 supports a plurality of transmission methods, allowing for a wide variety of formats of order 100s. Some formats may be changed, however, before further processing by central controller 200. Orders transmitted by mail in paper form, for example, may be scanned-in and digitized, using optical character recognition software to create digital text and then used to create orders 100. These embodiments are more fully described in the off-line embodiment described later.

Figure 6:
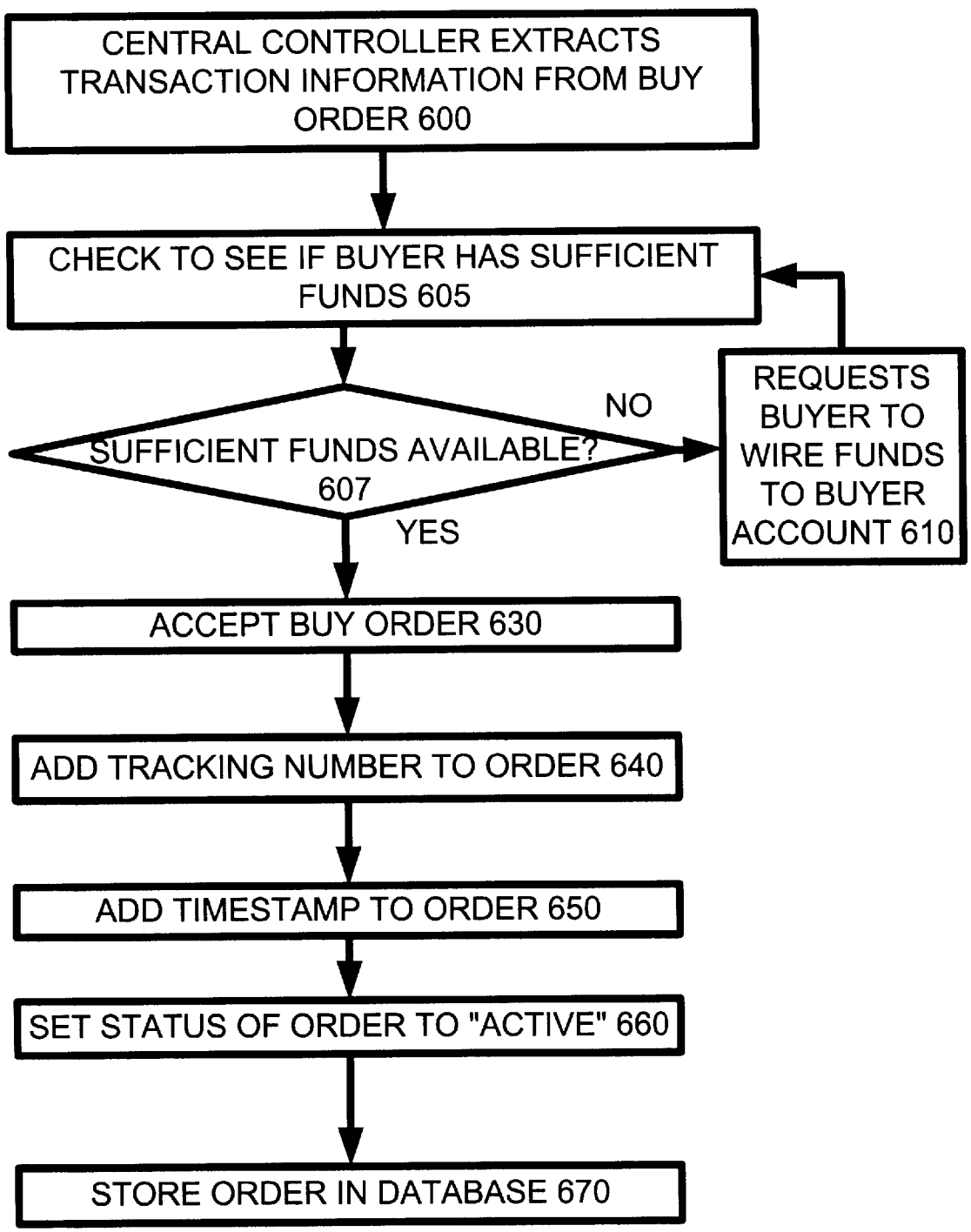
FIG. 6 illustrates an embodiment showing the acceptance of a buyer order by the central controller.

Referring now to FIG. 6, order 100 is received and checked to see that sufficient funds are available to cover the price of order 100, before order 100 is added to order database 267. At step 600, central controller 200 extracts quantity/price information from order 100. At step 605, central controller 200 checks buyer account detail in customer account database 297. This serves to "lock up" a portion of the available funds on the buyer's account, preventing him from using it again while order 100 is still active. At step 607, the central controller calculates the available funds, indicating whether sufficient funds are available. If sufficient funds are not available to cover the price of order 100, the buyer is requested to wire more funds into the account at step 610. Once additional funds have been wired to the account, central controller 200 then recalculates the available balance at step 605.

If all is well, the order is accepted at step 630. At step 640 a unique tacking number is added to the order 100. The central controller 200 timestamps order 100 at step 650 sets the status to "active" and stores order 100 in the order database 267. Order database 267 contains a record for the order 100. The record contains fields such as status, tracking number, timestamp, fund ID, buy/sell, quantity, order type, special instructions and customer ID. The status field has values of "pending," "active," "cancelled," "incomplete" and "completed." A status of "pending, means that the order cannot currently be transacted. Either, central controller 100 is still processing it, or the buyer has temporarily suspended it, or it is part of a multiple step signing key. An "active" order 100 is available to be executed. An "cancelled" order 100 can no longer be used. An order that was not matched or exchanged has a status of "incomplete". Order 100 that have been executed and confirmed have a status of "completed."

Figure 7:
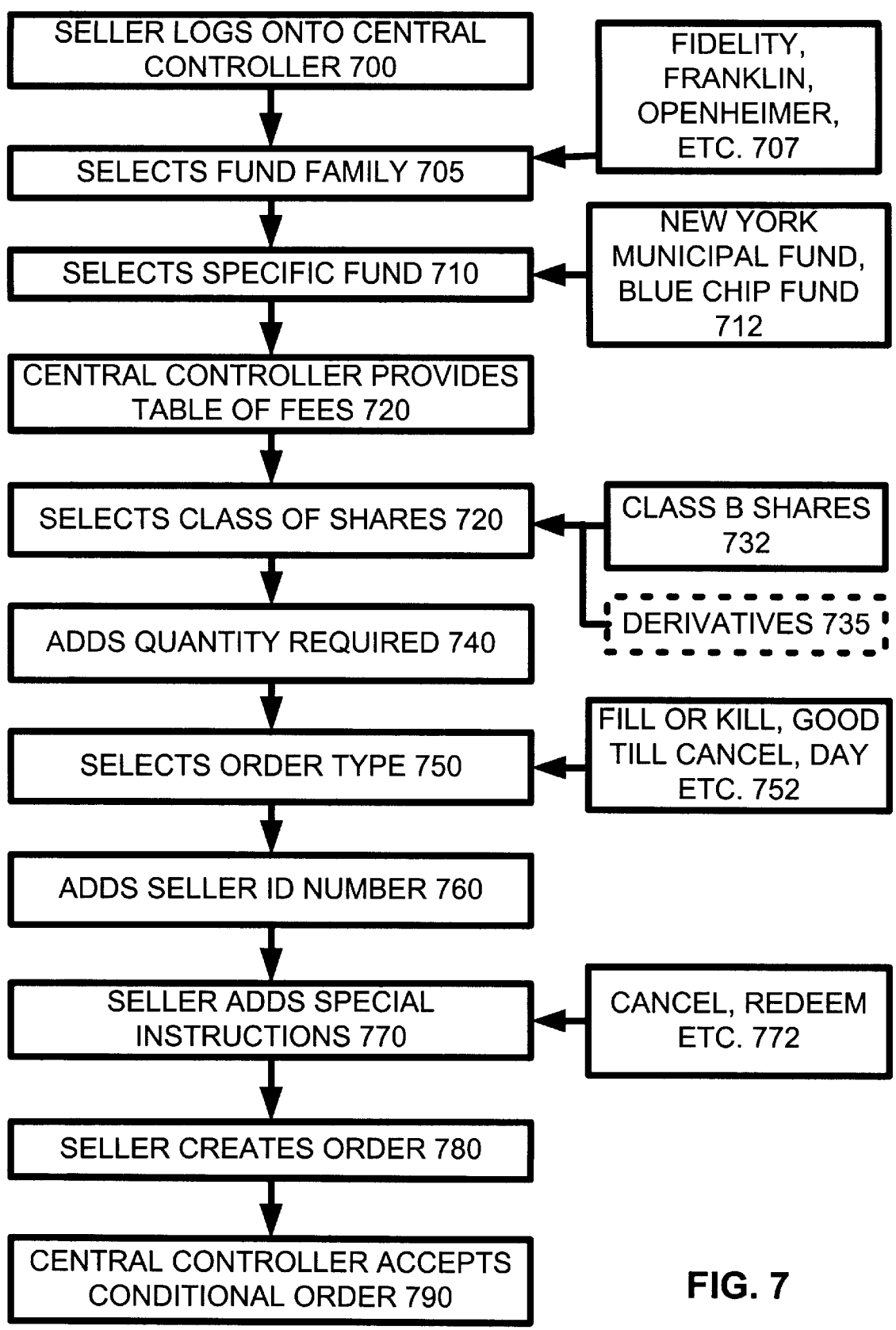
FIG. 7 illustrates an embodiment showing how a seller order is generated.

Referring again to FIG. 7 the process by which a seller creates an order. This process is a mirror image of the process described above in the buyer selection process of FIG. 5. Again once the process is completed the seller has entered into a binding contract with the intermediary.

Figure 8:
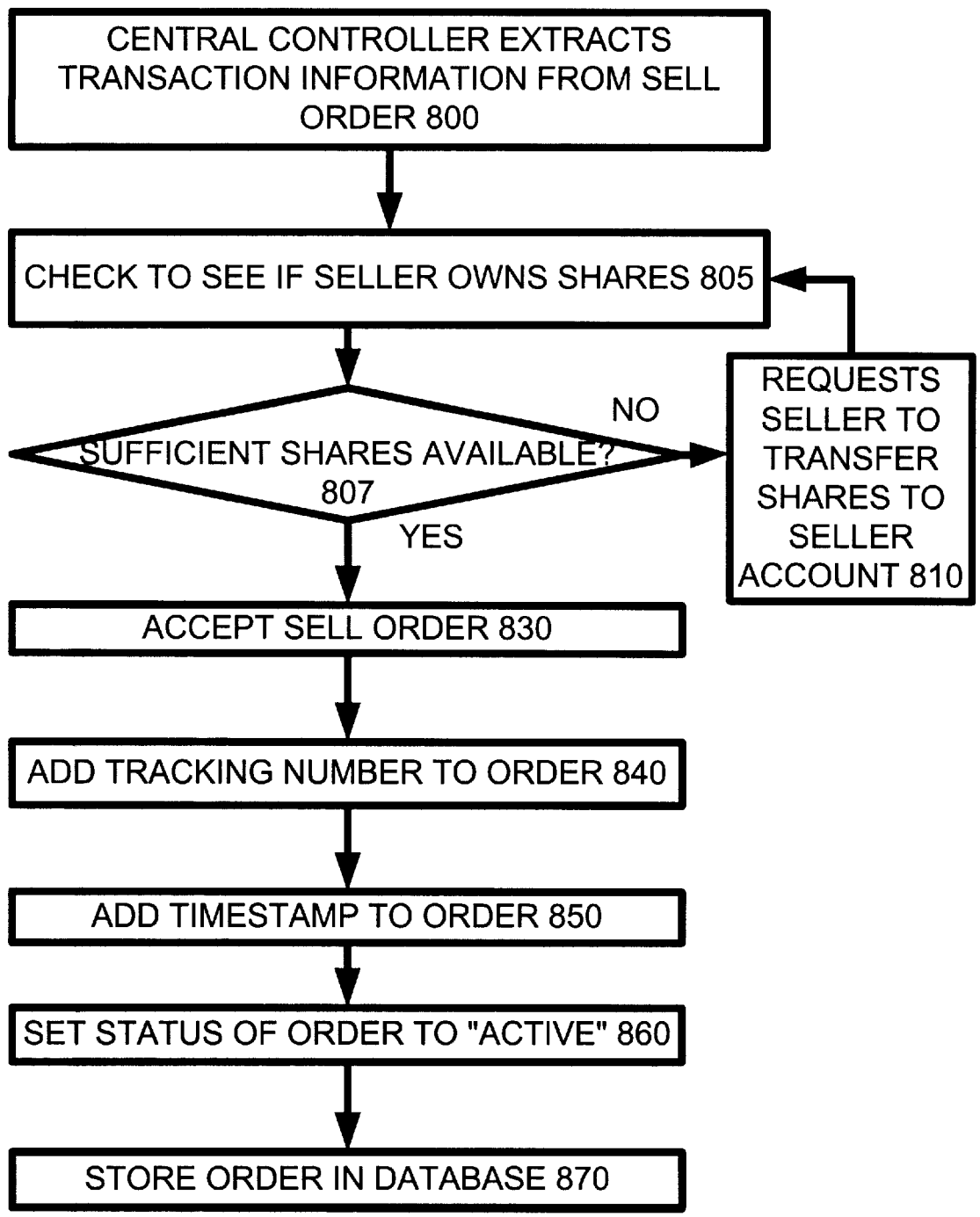
FIG. 8 illustrates an embodiment showing the acceptance of a seller order by the central controller.

Referring now to FIG. 8, order 100 is received and checked. If sufficient shares are available to cover the quantity of order 100, order 100 is added to order database 267. At step 800, central controller 200 extracts quantity information from order 100. At step 805, central controller 200 checks with the transfer agent to see if the seller has the shares. In another embodiment, central controller checks the seller's account in customer account database 297 to see if the shares are available. This serves to "lock up" a portion of the available shares in the seller's account, preventing him from selling the same shares twice while order 100 is still active. At step 807, the central controller contacts the transfer agent to see if the seller has the shares. If sufficient shares are not available to cover the quantity of order 100, the seller is requested to transfer more shares into his account at the transfer agent at step 810. Once additional shares have been transferred to the account, central controller 200 then reconfirms the quantity of shares available at the transfer agent at step 80.

If all is well, the order is accepted at step 830. At step 840 a unique tacking number is added to the order 100. The central controller 200 timestamps order 100 at step 850 sets the status to "active" and stores order 100 in the order database 267. The database is exactly the same as described above in the buyer protocol.

Figure 9:
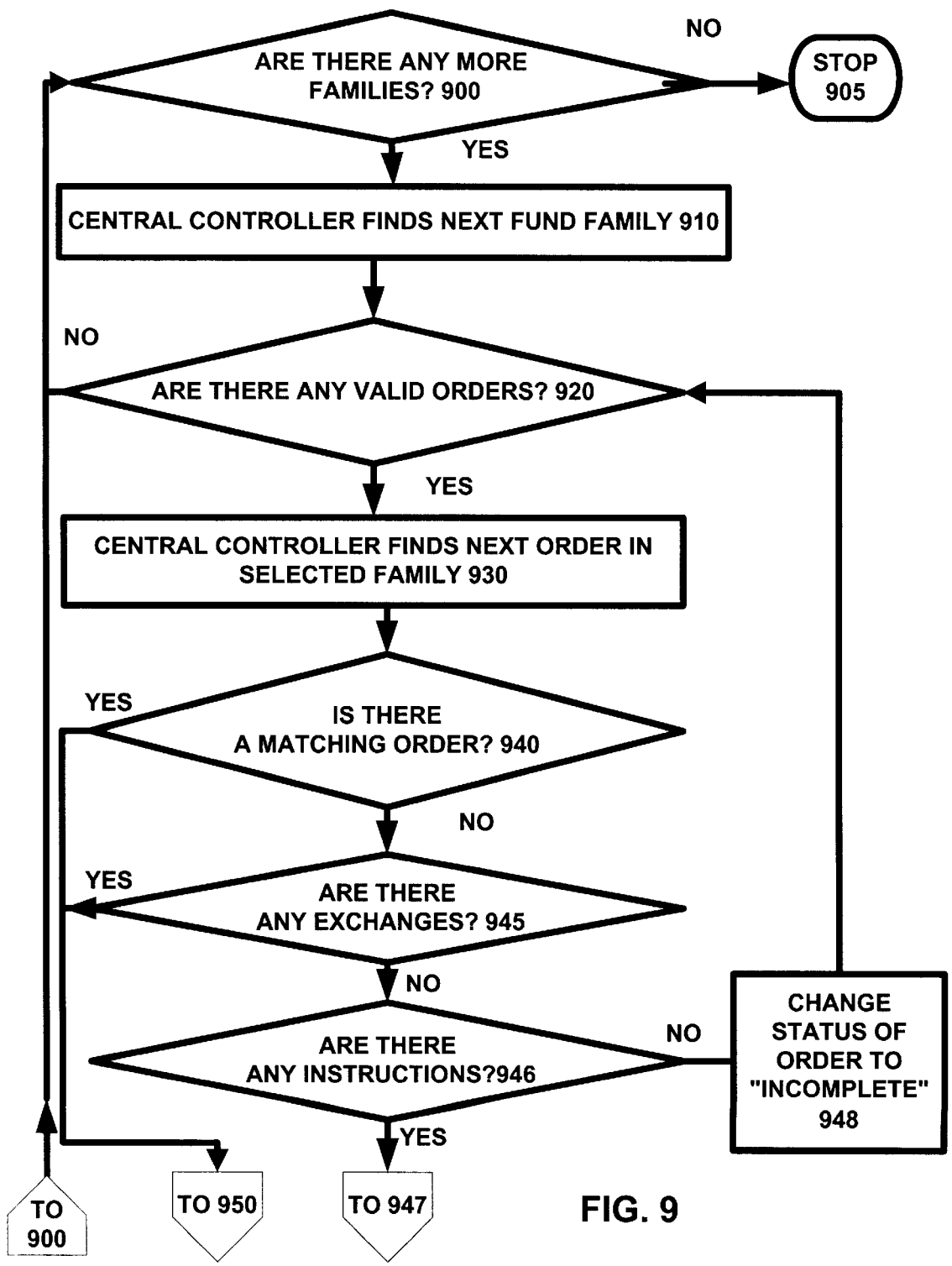
FIG. 9 and FIG. 9A illustrate an embodiment showing the end of the day matching of orders.
Figure 9A:
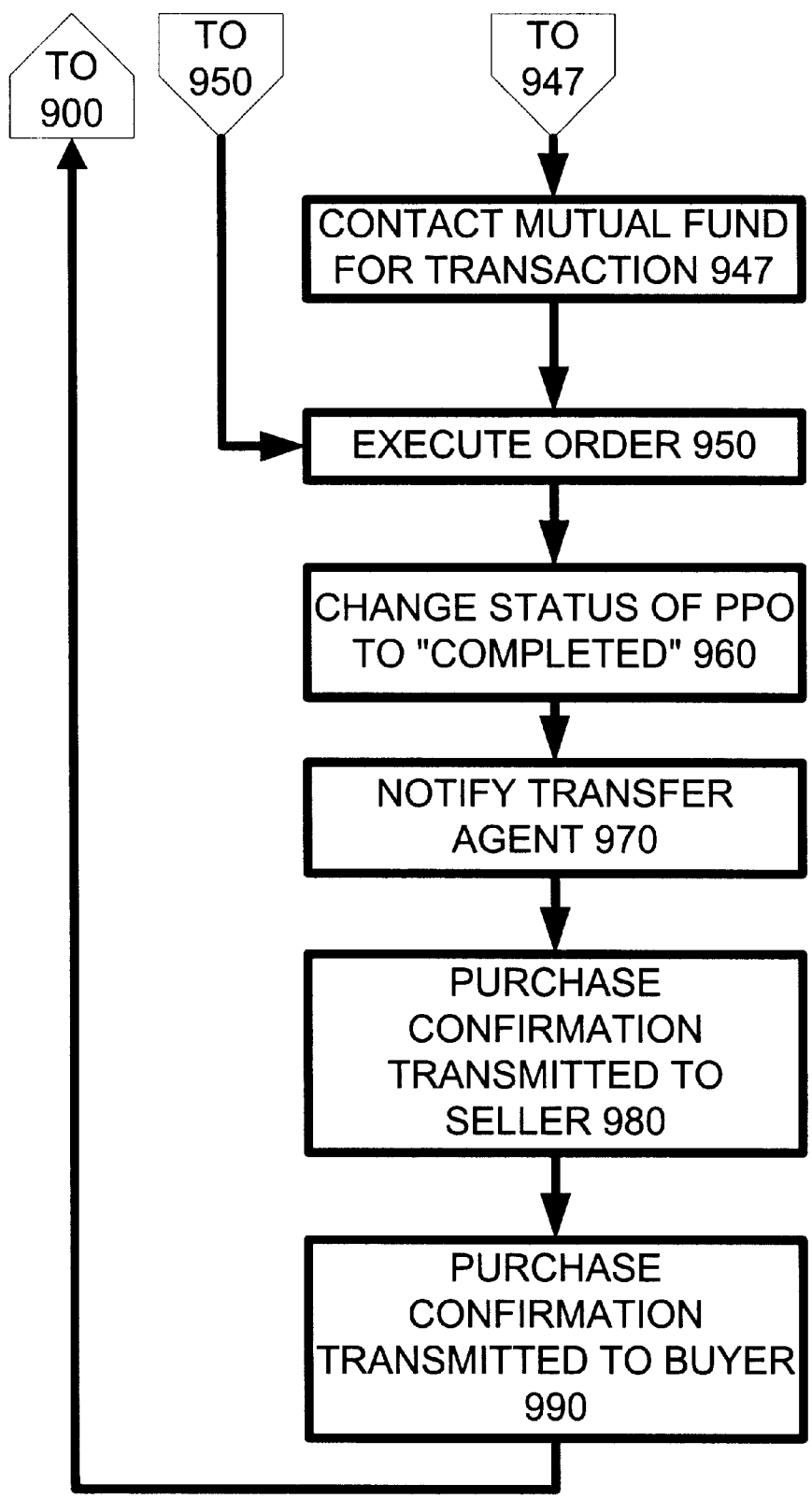

Referring now to FIG. 9, there is illustrated a procedure for the matching of orders. At step 900, central controller 200 searches order database 267 and groups all orders by family of funds, and check to see if there are any families in the list. If there are none this process is complete and stops at step 905. At step 910, the central controller finds the next (first) family with orders. At step 920, the central controller searches the list to see if there are any other valid orders in this fund family. If there are none, return to step 900 and start again. If there are orders, find the next (first) order at step 930. At step 940, the central controller checks to see if there is a matching order. If there are no matching orders, then at step 945 the central controller checks to see if there are any exchanges in the same fund family. At step 946, the central controller checks the special instructions to see if the order is now set to "incomplete" or executed in the primary market i.e. directly with the mutual fund. If any of conditions of step 940, 945 or 946 where met we continue to step 950 else we return to step 920 and find the next valid order Continuing from step 950, if there was an execution, at step 960 the status of the order is changed to "Completed". At step 970, the central controller notifies the transfer agent that there was a transaction and the shares are to be transferred on the settlement date. A confirmation is sent to the seller at step 980 and a confirmation is sent to the buyer at step 990.

In one embodiment, the central controller can act as transfer agent. There is commercial software that performs all shareholder accounting. One such package is FAST32 manufactured by Transfer Solution Inc.

Figure 10:
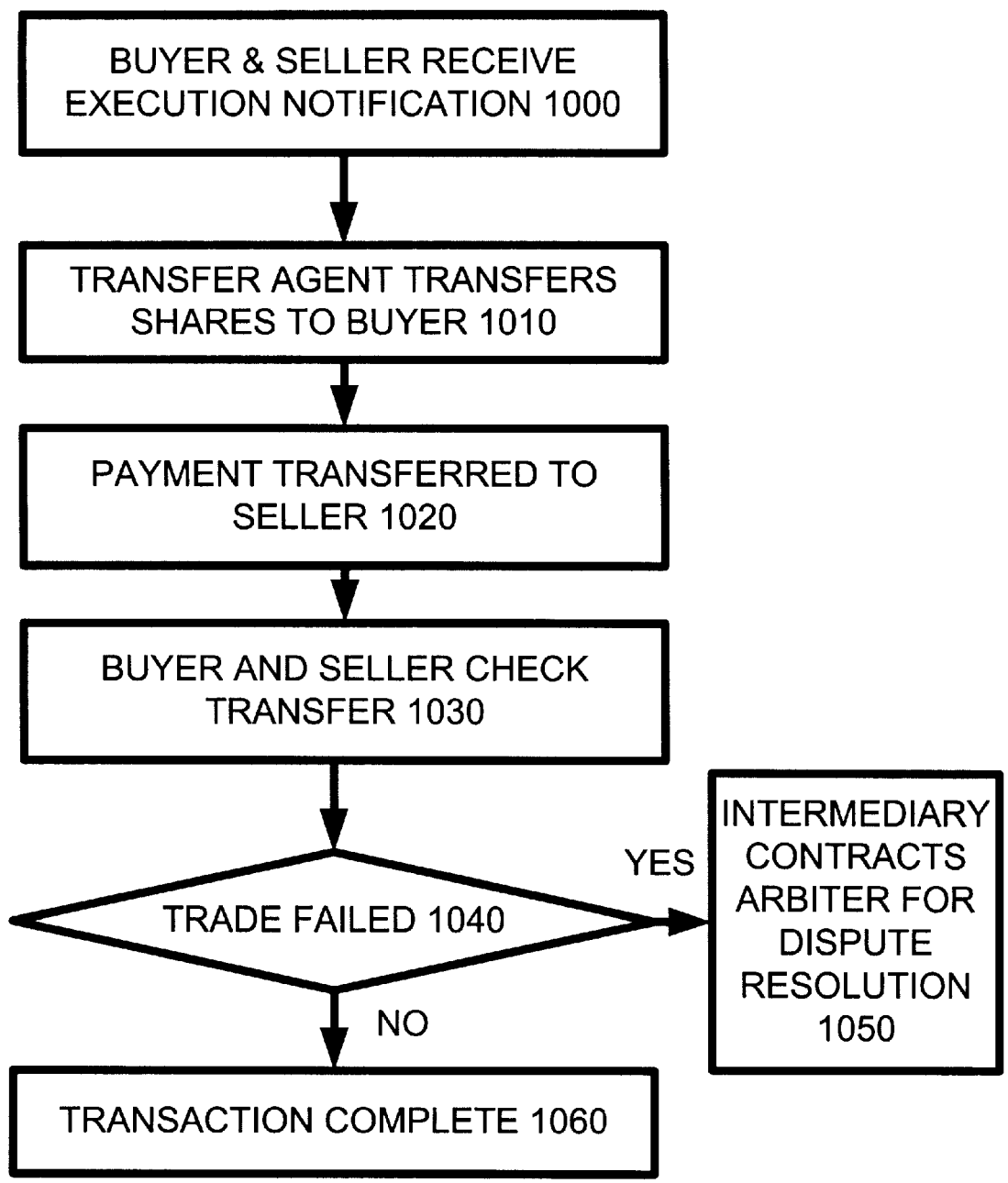
FIG. 10 illustrates an exemplary procedure for the settlement of trades.

FIG. 10 illustrates the settlement procedure between buyer and seller. At step 1000, the buyer and seller receive confirmations. As mentioned above this could occur in a variety of mechanisms including PDAs, beepers etc. At step 1010, the transfer agent transfer the shares into the buyer name. This transfer could involve the physical delivery of stock certificates. At step 1020, the central controller transfers funds to the seller. At step 1030 both buyers and sellers check the transfer. At step 1040 if the trade has failed according to the terms of order 100 then at step 1050 the intermediary contacts an arbiter for dispute resolution. This process is described in more detail in the dispute resolution embodiment described later. At step 1060 the transaction is complete.

There are many methods by which the providers of the system (the intermediary) could derive a revenue stream. In one embodiment, a flat fee is charged for every order 100 submitted. There could also be flat fees that would cover any number of orders 100 over a given period of time, allowing buyers to subscribe to the service much as they would subscribe to a newspaper. In another embodiment central controller 200 calculates a commission to add to the sale price and purchase price before it is allocated to each individual order 100. Alternatively, the method and apparatus of the present invention may be employed without a payment feature.

Off-line Embodiment

In one embodiment of the present invention, buyers, the intermediary and sellers communicate in an off-line manner with central controller 200. Rather than sending electronic mail or using web-based servers, the intermediary, buyers and sellers use a telephone, fax machine, postal mail, or other off-line communication tools.

A buyer/seller may use a telephone, for example, to generate order 100. The buyer/seller calls central controller 200 and is connected with an agent. The buyer/seller provides the terms of order 100 such as fund name, class of shares, quantity, etc. The buyer/seller also provides his customer ID, password, or private key so that central controller 200 can authenticate his identity. The agent puts this data into digital form by typing it into a terminal. The agent then provides the buyer/seller with the terms of their order. Once the buyer/seller accepts the terms, the agent then adds legal language to form order 100. Order 100 is then transmitted to central controller 200 where it is added to order database 267 as described in the on-line embodiment In an alternative embodiment, the buyer/seller calls central controller 200 and is connected with a conventional Interactive Voice Response Unit (IVRU) which allows the buyer/seller to enter some or all of the terms of order 100 without the assistance of a live agent. The buyer/seller initially selects from a menu of fund families with the touch-tone keys of his phone. The specific funds can also be selected in the same manner. The central controller can then announce the schedule of fees for each fund and the buyer/seller can then use his touch-tone keys to select the quantity required. This information can then be used to generate order 100.

Buyers and sellers may also communicate with an agent at central controller 200 through faxes or postal mail. The agent receives the message and proceeds to digitize it and form order 100 as described above.

Certificate Authority Embodiment

Figure 11:
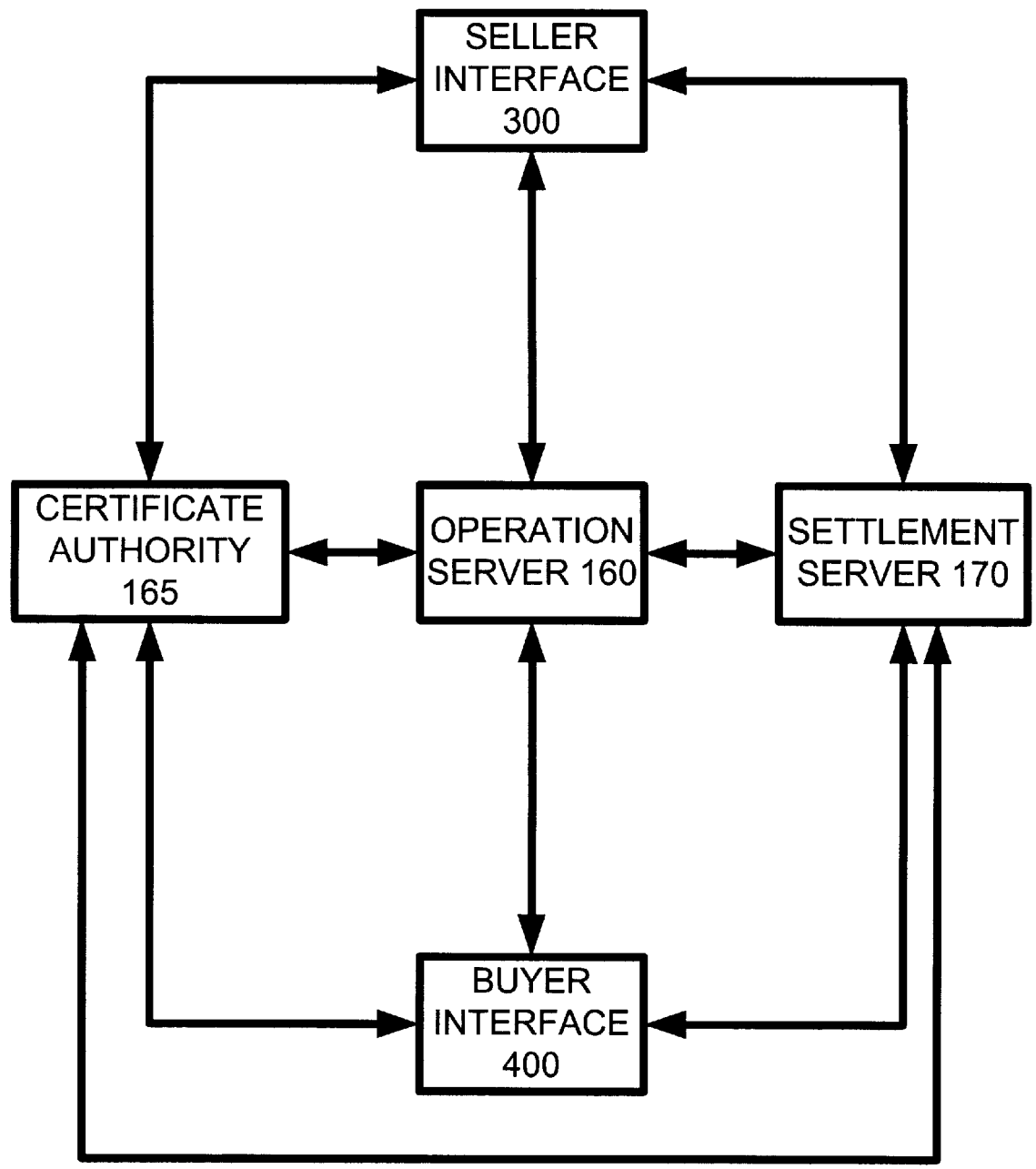
FIG. 11 illustrates an embodiment showing the use of a certificate authority and a settlement server.

In one embodiment of the present invention, central controller 200 is separated into three distinct elements: operations server 160, certificate authority 165, and settlement server 170. Each server performs a distinct task in the process of managing order 100 and execution 110. This separation makes it more difficult for attackers to compromise the system, as they must defeat the security of three separate systems, instead of one. As indicated in FIG. 11, these servers work in conjunction with buyer interface 400 and seller interface 300. Operations server 160 has the task of posting orders 100 and accepts all transactions previously authenticated by certificate authority 165. Certificate authority 165 authenticates the identity of buyers and sellers while settlement server 170 verifies the ability of buyers to pay and the ability of sellers to deliver shares specified in order 100s. Operations server 160, also matches orders and generates execution 110 and confirmation In this embodiment, each server type may be distributed over a number of servers.

There are two types of certificate authorities. The first is an internal server and the second is a trusted third party. This third party could also be the settlement server as well. For example, banks, insurance companies and other financial institutions could issue digital certificates establishing the identity of an individual and convey other pertinent information such as the individual's authority to represent an organization and his spending limit. Similarly they could also certify the individual's ability to pay or deliver goods much as they do now when they issue letters of credit. These third parties have the financial capability to back up their certifications and thus can insure both buyers and sellers against fraud.

An example of such a system is the CertAuthority Solution manufactured by CertCo LLC. This system also comes with an optional temper evident hardware based private key that is easy to transport and store securely. An example of a settlement server is the Integrated Commerce Service manufactured by Open Market Inc. It provides back-office services necessary to run Web-based businesses. Services include on-line account statements, order-taking and credit card payment authorization, credit card settlement, automated sales tax calculations, digital receipt generation, account-based purchase tracking, and payment aggregation for low-priced services.

The practice of using certificate authorities and settlement servers is well known in the art and need not be described here in detail. For reference, one of ordinary skill in the art may refer to Winfield Treese and Lawrence Stewart, Designing Systems for Internet Commerce, Addison Wesley, 1998.

This set of protocols describes one possible implementation of an infrastructure to support order 100. It is important to note that operations server 160, certificate authority and settlement server 170 can conceivably be the same entity. In this case the protocols are somewhat simplified but can still be achieved using the same software mentioned above.

Cryptographic Authentication Embodiment

In the previous embodiments, authentication of the buyer and seller involves checking the attached ID or name and comparing it with those stored in customer database 255. Although this procedure works well in a low security environment, it can be significantly improved through the use of cryptographic protocols. These protocols not only enhance the ability to authenticate the sender of message but also serve to verify the integrity of the message itself, proving that it has not been altered during transmission. Encryption can also prevent eavesdroppers from learning the contents of the message. Such techniques shall be referred to generally as cryptographic assurance methods and will include the use of both symmetric ad asymmetric keys as well as digital signatures and hash algorithms.

The practice of using cryptographic protocols to ensure the authenticity of senders as well as the integrity of messages is well known in the art and need not be described here in detail. For reference, one of ordinary skill in the art may refer to Bruce Schneier, Applied Cryptography, Protocols, Algorithms, And Source Code in C. (2nd Ed, John Wiley & Sons Inc., 1996).

Figure 12:
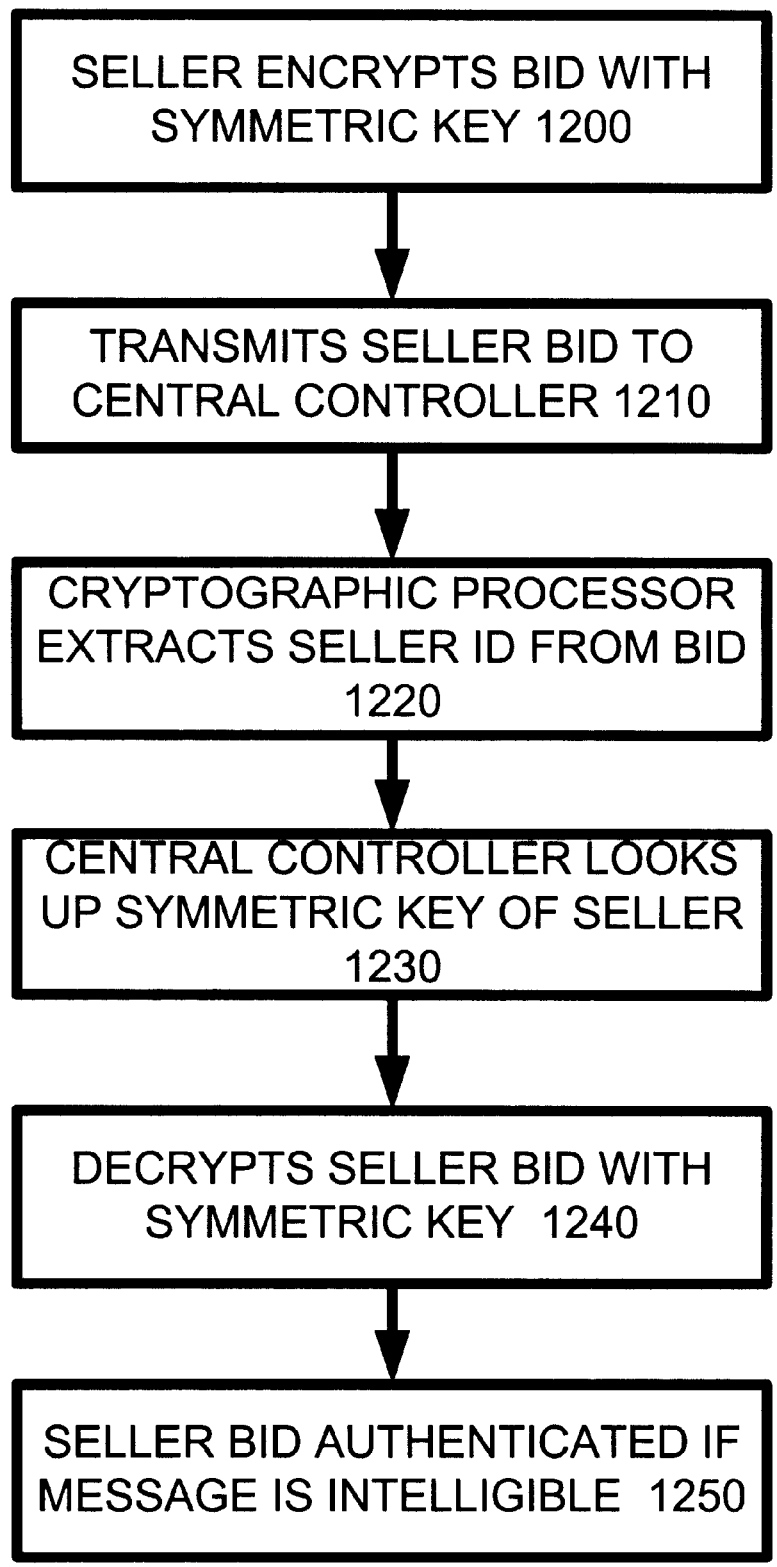
FIGS. 12 through 15 illustrate an exemplary authentication procedure using cryptographic protocols.

FIG. 12 describes a symmetric key embodiment in which the seller and central controller 200 share a key. Thus both encryption and decryption of order 100 are performed with the same key. This encryption may be implemented with an algorithm such as DES (U.S. Government standard, specified in FIPS 46, published in November 1976), or with any of several algorithms known in the art such as Triple DES, IDEA, Blowfish, RC4, RC2, CAST, etc. The seller encrypts order 100 with his assigned symmetric key at step 1200 using cryptographic processor 310 of seller Interface 300. The key may be stored in message database 370 or otherwise noted or memorized by the seller. The encrypted seller order 100 is then transmitted to cryptographic processor 210 of central controller 200 at step 1210. Cryptographic processor 210 extracts the seller ID from seller bid 115 at step 1220 and looks up the symmetric key of the seller in cryptographic key database 290 at step 1230, decrypting seller order 100 with this key at step 1240. Cryptographic key database 290 contains algorithms and keys for encrypting, decrypting and/or authenticating messages. At step 1250, if the resulting message is intelligible, then the same key must have encrypted it. Authenticating that the seller must have indeed been the author of seller order 100.

This procedure makes it significantly more difficult for an unauthorized seller to represent himself as a legitimate seller. Without cryptographic procedures, an unauthorized seller who obtained a sample seller order 100 from a legitimate seller would be able to extract the seller ID and then attach this ID number to unauthorized seller order 100s. When seller order 100 has been encrypted with a symmetric key, however, an unauthorized seller obtaining a sample seller order 100 only discovers the seller's ID number, not the symmetric key. Without this key, the unauthorized seller cannot create a seller order 100 that will not be discovered by central controller 200, since he cannot encrypt his message in the same way that the authorized seller could. The symmetric key protocol also ensures that seller order 100 has not been tampered with during transmission, since alteration of the message requires knowledge of the symmetric key. An encrypted seller order 100 also provides the seller with more anonymity.

Figure 13:
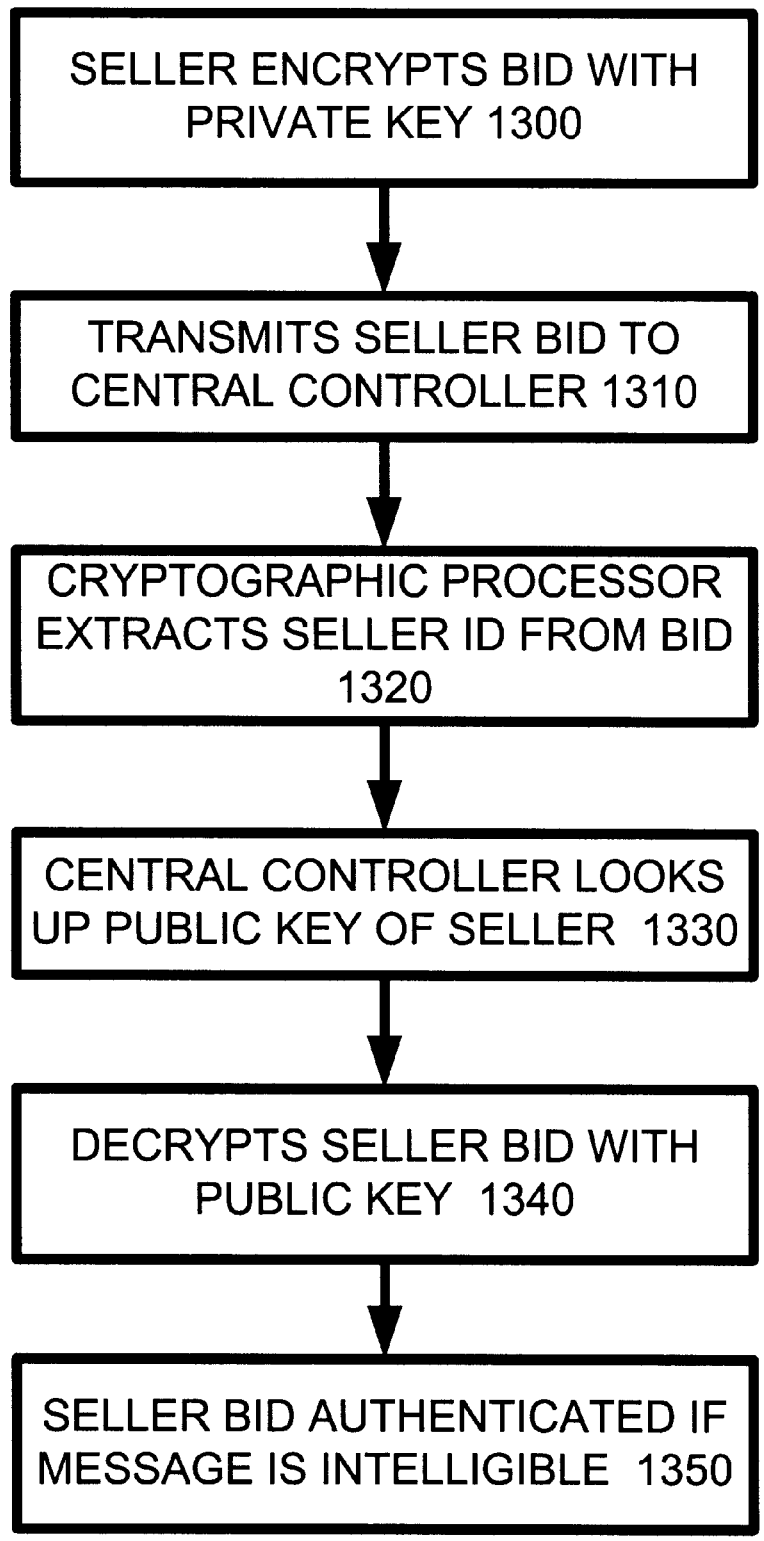

Referring now to FIG. 13, there is shown an asymmetric key protocol in which seller order 100 is encrypted with a private key and decrypted with a public key. Two such algorithms for this procedure are RSA and DSA. At step 1300, the seller encrypts seller order 100 with his private key using cryptographic processor 310, transmitting seller order 100 to central controller 200 at step 1310. Cryptographic processor 210 extracts the seller ID at step 1320 and looks up the seller's associated public key in cryptographic key database 290 at step 1330, decrypting seller order with this public key at step 1340. As before, if seller order 100 is intelligible then central controller 200 has authenticated the seller at step 1350. Again, unauthorized sellers obtaining seller order 100 before central controller 200 received it are not able to undetectably alter it since they do not know the private key of the seller. Unauthorized sellers would, however, be able to read the message If they managed to obtain the public key of the seller. Message secrecy is obtained if the seller encrypts seller order 100 with his public key requiring the attacker to know the seller's private key to view seller order 100.

Figure 14:
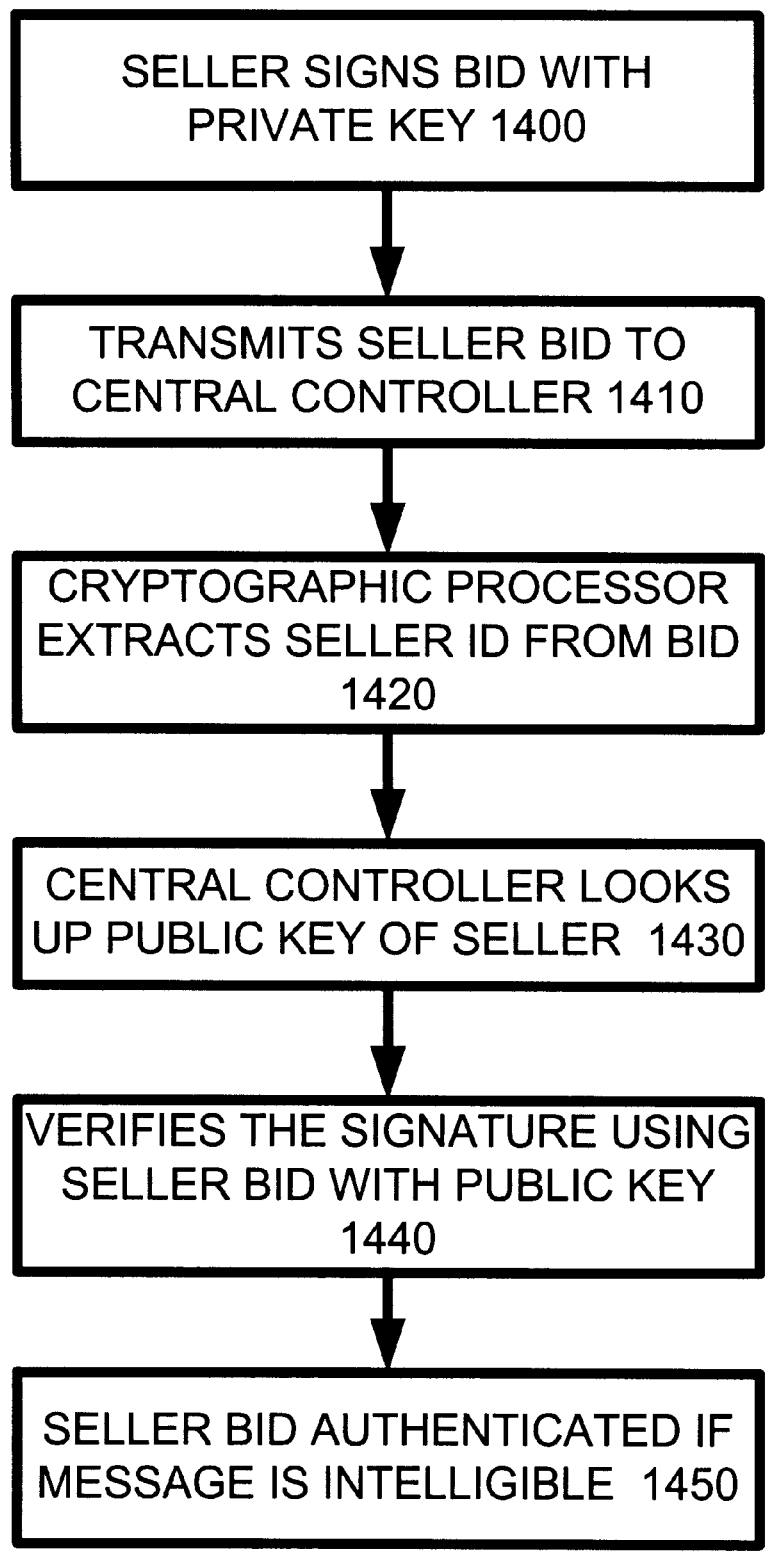

FIG. 14 shows a cryptographic technique using digital signatures to provide authentication and message integrity. One such algorithm is DSA (Digital Signature Algorithm) uses U.S. Government standard specified in FIPS PUB 186. As in the asymmetric protocol described above each seller has an associated public and private key. The seller signs seller order 100 with his private key at step 1400 with cryptographic processor 310 and transmits it to central controller 200 at step 1410. Central controller cryptographic processor 210 extracts she seller ID at step 1420 and looks up the seller's public key at step 1430 verifying the signature using seller order 100 and the public key of the seller at step 1440. If seller order 100 is intelligible, then central controller 200 accepts seller order 100 as authentic at step 1450.

Figure 15:
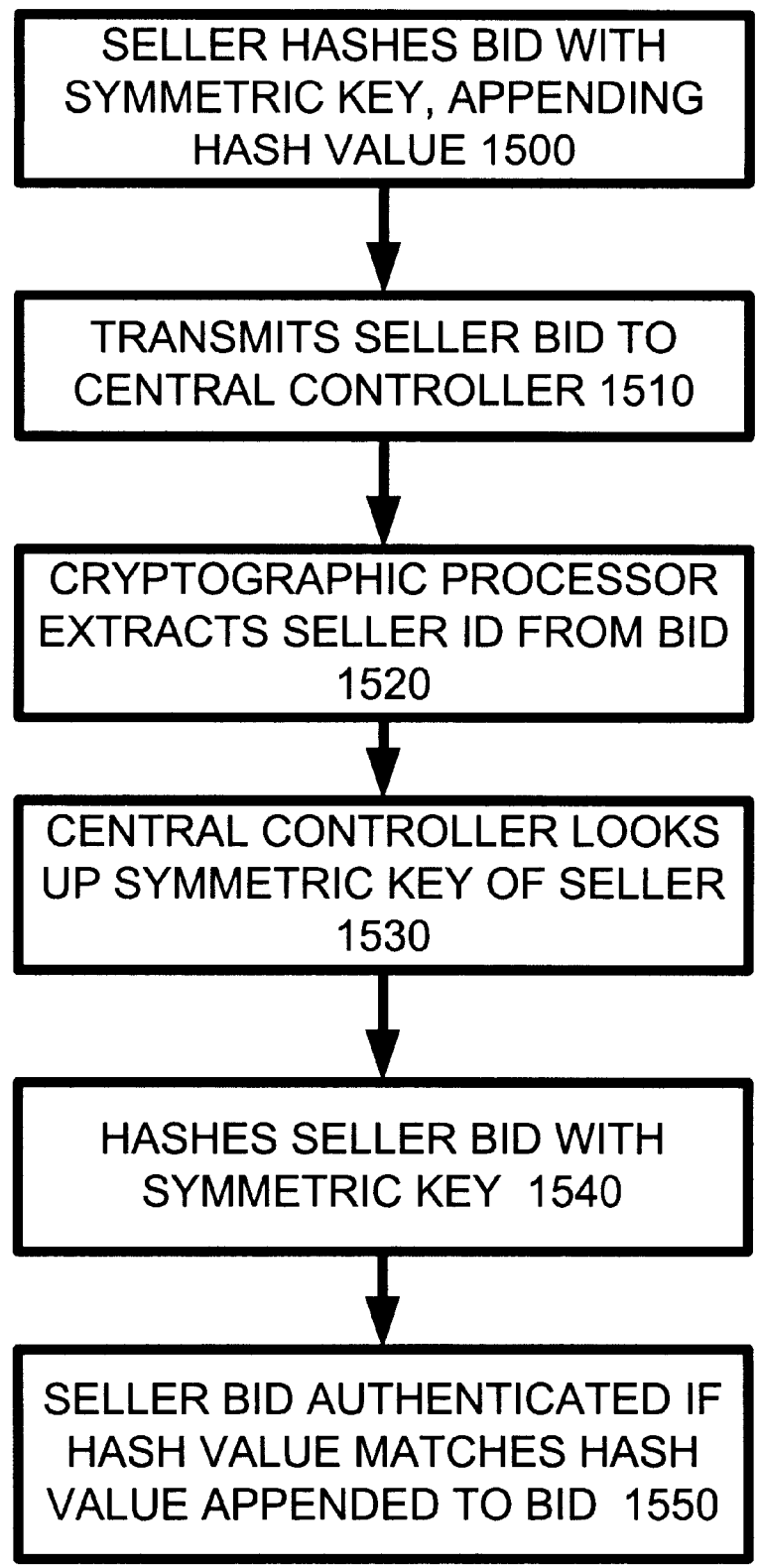

Referring now to FIG. 15, there is described a cryptographic technique using message authentication codes for verifying the authenticity and integrity of seller order 100. In the hash protocol of the present invention, the seller and central controller 200 share a symmetric key, which the seller includes in a hash of seller order 100, at step 1500. In the hash protocol, a one-way function is applied to the digital representation of seller order 100, generating a code that acts much like the fingerprint of seller order 100. Any of the MD algorithms, such as RIPEMD-160, MD5, SHA-1, MDC-2, MDC-4 and the like may be applied in this application. After transmitting seller order 100 to central controller 200 at step 1510, cryptographic processor 210 extracts seller ID from seller order 100 at step 1520. Then cryptographic processor 210 looks up the seller's symmetric key at step 1530 and hashes seller order 100 with this symmetric key at step 1540, comparing the resulting hash value with the hash value attached to seller order 100. If the values match at step 1550, the integrity of seller order 100 is verified along with the authenticity of the seller.

Although cryptographic techniques can provide greater confidence in the authenticity of seller order 100, they are useless if the seller's cryptographic keys are compromised. An attacker obtaining the symmetric key of another seller is indistinguishable from that seller in the eyes of central controller 200. There is no way to know whether the seller was the true author of seller order 100, or an attacker with he right cryptographic keys. One way to solve this problem (known as undetected substitution) is to use biometric devices such as a fingerprint reader, voice recognition system, retinal scanner and the like. These devices incorporate a physical attribute of the seller into seller order 100, which is then compared with the value stored in customer database 255 at central controller 200. In the present invention, such devices attach to seller interface 300.

Fingerprint verification, for example, may be executed in several forms. (a) before the creation of seller order 100, (b) during the generation of seller order 100 in response to prompts from central controller 200, (c) at some predetermined or random times, or (d) continuously by incorporating the scanning lens into seller interface 300 such that the seller is required to maintain his finger on the scanning lens at all times for continuous verification while seller order 100 is generated.

An example of such an identification device is the FingerCheck FC200 available from Startek, a Taiwanese company. The FC200 is readily adaptable to any PC via an interface card and is about the size of a computer mouse. The fingerprint verifier utilizes an optical scanning lens. The seller place his finger on the lens and the resulting image is scanned, digitized, and the data compressed and stored in memory. Typically, a 256-byte file is all that is required. Each live-scan fingerprint is compared against the previously enrolled/stored template, stored in data storage device 360. If the prints do not match cryptographic algorithms executed by cryptographic processor 335 may prevent the seller from generating a order 100.

In a voice verification embodiment, the seller's voice is used to verify his identity, This embodiment has the advantage of not requiring the use of any specialized hardware since it can be implemented over a standard phone connection. The seller's identity is verified at central computer 200. The process of obtaining a voiceprint and subsequently using it to verify a person's identity is well known in the art and therefore need not he described in detail herein. One of ordinary skill in the art may refer to SpeakEZ, Inc. for voice identification/verification technology. Conventional speaker identification software samples the seller's voice. This sample is stored at central controller 200 in customer database 255. Each time the seller wants to transmit seller order 100 to central controller 200, he is required to call central controller 200 and speak into the phone at the prompt for a voice sample. If this sample matches that stored in customer database 255, the seller is provided a password which is incorporated into the digital signature appended to seller order 100. Any seller order 100 received without appropriate voice match password is not accepted. The voiceprint may also be stored in a database within data storage device 360 of seller interface 300, to verify seller's identity locally prior to allowing seller order 100 to be created.

Another method of authentication and identification is the use of smart cards 365 attached to sellers interface 300. An example of such a device is the SmartPortDT manufactured by Tritheim Technologies, Inc. The SmartPortDT is an intelligent desktop smart card reader/writer designed for electronic commerce, network and Internet security and software copy protection. The SmartPortDT is fully Compliant with ISO 7816 T=0, T=1, T=14, PC/SC and Mondex standards. In this embodiment, the intermediary provides each potential seller with a smart card. Embedded on the smart card is the seller ID and a second private key for the seller, which would remain unknown to the seller. In this protocol unauthorized sellers would have to have knowledge of the seller's keys (symmetric, asymmetric or hash function) and would have to be in possession of the seller's smart card. This technique could also be augmented with biometric devices.

In another embodiment, sellers could be provided with a hardware device used for authentication. These devices are usually called tokens. Two common tokens are made by Security Dynamics and by Axent. The Security Dynamics SecurID card has a window on the front, which displays a cryptographically generated random number, which changes once a minute. The matching authentication server, central controller 200, can duplicate the computation to verify the number. The seller simply copies the number from the card along with his customer ID in seller's order 100. The Axent Defender card is a small calculator device with a keypad and a display. In operation, the central controller 200 sends the seller a challenge code, which is entered into the card along with the customer ID. The seller transmits the response code to central controller 200. Central controller 200 executes the same computation and compares the result.

Although the above cryptographic and biometric protocols describe the authentication and validation of seller order 100, they may be equally applied to the authentication and validation of buyer order 100, confirmation 120, or any at message or communication between buyers, sellers, and central controller 200.

Currently there are two encryption protocols that are standard components of Internet browsers. These are available in such browsers as Netscape Navigator and Microsoft Internet Explorer. These protocols are the Secure Socket Layer (SSL) and the Secure Electronic Transaction (SET). In one embodiment, these techniques could also be used to achieve some of the cryptographic requirements mentioned above.

Market Making Embodiment

According to another aspect of the invention, the central controller includes stored programs for causing CPU 200 to act as a market maker i.e. to create buy and sell orders for each fund and share class specifying a given quantity and a given discount/premium to be subtracted/added to the NAV. For example, at the beginning of every day the central controller will create a buy order for 100 shares of a certain fund such as the Oppenheimer Limited Tenn New York Municipal Fund class A shares at a 2% premium to NAV. The central controller also creates a sell order for 100 of the same shares at a 1% discount to NAV. This process ensures that there is always a market for every share in every fund and thus provides liquidity for all participants in transactions of shares of investment companies. In this process, the intermediary can add new order or change existing orders at will, using the same process illustrated in FIGS. 5 to 10. Thus in this embodiment the intermediary actsas a buyer and seller all the time for all the shares.

Derivative Security Embodiment

Currently derivatives on shares of investment companies do not exist. This because there is presently no secondary market in the shares of these investment companies, and so the transaction cost of hedging these derivatives becomes prohibitive. According to a derivative trading embodiment according to the present invention, a buyer or a seller selects the particular derivative the customer wishes to trade (Steps 535 and 735 in FIGS. 5 and 7). An example of this would be a buyer who wished to buy forward 100 class A shares of the Oppenheimer Limited Term New York Municipal Fund in 6 months. Thus at step 535 they would select a 6 month forward contract to achieve this trade.

Anonymous Transactions Embodiment

As mentioned previously, the present invention provides for the anonymity of both buyers and sellers. Such anonymity is accomplished by eliminating all references to names of the individuals for all transactions. Buyers and sellers are prevented from seeing information other than order 100. Although using ID numbers can provide anonymity, both for buyers and sellers, there are a number of potential weaknesses. First, if the database of ID numbers stored in customer database 255 and the intermediary is compromised, anonymity is destroyed since the message sender can be looked up in customer database 255. To prevent this, the ID numbers are encrypted with the public key of central controller 200, so that even if it is stolen it is useless without the private key.

Although we have described only one possible method for maintaining anonymity there are other equivalents. For example, if the embodiment included telephone messaging, the identity of the buyer and seller could be maintained using conventional voice modification techniques. If order 100s were in a paper form, the form could be scanned using optical character recognition and translated into digital form, discarding any information that could be found in the original document.

Multiple Authority Embodiment

In one embodiment of the present invention, there may be a requirement that multiple individuals in a joint account sign an order 100. This is a common occurrence, since many married couples have joint accounts and many corporations require at least 2 people to sign a financial order before it is valid. The present invention allows for multiple signers, by using a cryptographic technology called key fragmentation. In this embodiment, each individual at the buyer is assigned a specific fragment of the private key. An example of such a mechanism is the Multi-Step Signing manufactured by CertCo LLC.

Discount Embodiment

In this embodiment buyer could specify the minimum discount off the fee structure they required. For example, if the standard fee for Class B shares with 5 years to go to conversion was 5%, the buyer could bid to buy the shares at a 3.5% discount. In this example the seller would effectively pay a 3.5% "redemption" fee which would translate into a 3.5% discount the buyer would pay for the mutual fund. In a similar manner the seller could specify the maximum discount he was willing to pay. These discounts could be incorporated into order 100 in any of the embodiments described.

Price Embodiment

In one embodiment, shares of mutual funds could be traded the same way as any stock currently traded on a stock exchange. Here buyers and sellers would indicate the prices they are willing to trade at, and the central controller would match trades much the same way that shares are currently matched on NASDAQ. This would then correspond to a fully functioning secondary market for mutual funds. An example of where this is extremely useful is in the case where the market is rapidly declining during the day. If the seller could sell early on in the day, he would get a better price than if he waited till the end of the day to trade.

Barter Embodiment

Not all transactions require the transfer of money from buyer to seller. In a barter transaction the distinction between buyer and seller disappears, resulting in a contract between a number of first parties and a second party. The first party creates order 100 and specifies the quantity of a particular mutual fund he is offering and then specifies a list of equivalent mutual funds he is willing to receive. At the end of the day we can calculate the monetary value of the shares he is trading and thus calculate the equivalent number of shares in each of the alternatives he should receive. The second party now creates another order 100 by also specifying the quantity of another fund he wishes to trade. Once again, the central controller can now match the order and calculate the exchange of one fund for another.

Price Hierarchy Embodiment

In this embodiment buyers and sellers can specify a hierarchy they wish to trade. An example would be a buyer who specifies he wishes to purchase class B shares with 3 years remaining to conversion of a fund for 3% discount. If he is not matched, he then would be willing to purchase class B shares with 1 year remaining for a 1.5% discount. Filing that, he would be willing to purchase class C shares for a 1% discount. Finally failing that cancel the order.

Arbitration Protocols

Although the previous embodiments have described the delivery of shares from seller to buyer as the end of the process, there will inevitably be disputes arising from some transactions, requiring follow-up activity to resolve these disputes. The present invention can support dispute resolution in two ways.

First language can be built into every order 100 requiring that both parties submit to binding arbitration of all disputes, helping to avoid more costly and time consuming legal battles in a court of law.

Second, central controller 200 can support the arbitration process by providing an arbiter for each dispute. Such arbitration might be required when the funds transferred from the buyer do not correspond to the value of the shares specified in the seller order 100. A seller selling $50,000 of New York Municipal Bond Fund, for example, might seek damages against a buyer who delivered only $45,000. Instead of seeking damages, the seller may seek interest due and the remaining balance of the funds. In arbitration involving funds, the seller may submit a copy of the confirmation 120 to central controller 200 along with the tracking number of order 100, allowing the arbiter to establish whether or not the buyer fulfilled the conditions of order 100.

In an alternative embodiment, transaction data can be sent to third party arbiters outside the system. Central controller 200 may send a copy of order 100, execution 110, confirmation 120 and the transfer agent's identification numbers to the arbiters. Cryptographic keys may also be provided to the arbiters if there are questions of authenticity or non-repudiation.

Applications of the Invention

Other applications and advantages of the present invention are described below:

1) Individual selling Class B shares in the first year after purchase.

In this case a typical fee schedule would require the seller to pay a 4% deferred sales charge. By selling to another individual, instead of redeeming the shares, the seller may be able to pay only a 2% "deferred charge." The buyer in this instance would get a 2% discount on the purchase.

2) Individual selling Class B shares in the third year after purchase.

The typical deferred sales charge decrease by 1% per year the individual holds the shares, so the charge now would be 2%. Thus the seller would only pay 1% and the buyer now would receive a 1% discount.

3) Individual buying class A shares.

The typical fee a buyer would pay for class A shares is 3.5%, so a seller could easily ask for 2% extra for his class A shares. In such case both the seller and the buyer would achieve a better deal than buying direct from the fund.

An individual exchanging class B shares in a Fidelity Growth Fund for Class B shares in an Oppenheimer Growth Fund.

4) A seller selling Class B shares in an Oppenheimer Municipal Fund and a buyer buying shares in an Oppenheimer Growth Fund.

Since the fund family does not charge a fee for exchanging funds, the seller could sell his Municipal Fund for a smaller fee to the buyer. The buyer can now exchange the Municipal fund for the Growth fund for no charge. Again both the buyer and the seller have achieved better pricing than from the fund directly.

5) An individual trading his mutual fund shares like any other stock

Currently individuals can only trade mutual fund at their closing prices. If the market started falling early in the day, they could presumably sell their shares for a higher price earlier on in the day.

Having described preferred embodiments of the present invention, it is noted that modifications and variations can be made by persons skilled in the art in light of the above teachings. It is therefore to be understood that changes may be made in the particular embodiments of the invention disclosed which are within the scope and spirit of the invention as outlined by the appended claims.

I claim:

1. A computer based method for facilitating a secondary market transaction of shares of investment companies between at least one buyer, an intermediate, and a seller, comprising:

receiving at the intermediate a sell order to sell in the secondary market shares of an investment company from the seller, binding the seller to said intermediate, said intermediate having a central controller including database storage;

assigning a sell tracking identification, corresponding to said sell order and said seller;

storing said sell order and sell tracking identification in said database;

receiving a buy order from the buyer, assigning a buy tracking identification company to said buy order and said buyer;

storing said buy order and buy tracking identification to said database;

scanning the database for matching sell and buy orders;

binding the buyer to the intermediate;

executing trade upon a match;

forwarding trade confirmation to a transfer agent; and forwarding confirmations of transaction to the buyer and the seller.

2. The method of claim 1, wherein either the buyer or the seller stipulates a discount or premium off the NAV.

3. The method of claim 1, wherein either the buyer or the seller stipulates a price for the shares they will trade.

4. The method of claim 1, wherein the purchase stipulation is a commission or cancellation fee defined by the intermediate.

5. The method of claim 2, wherein said buy or sell order further includes a settlement date.

6. The method of claim 2, wherein the buy or sell order further comprises a quantity specifier.

7. The method of claim 6, wherein the buyer or seller specifies additional conditions on the shares in the order.

8. The method of claim 6, further comprising the step of authenticating by the central controller the identification and authority of the customer.

9. The method of claim 8, wherein the step of authentication of the customer's identification is by comparing the customer's identification, with a customer identification stored in the central controller database.

10. The method of claim 8, wherein the step of authentication of the customer's identity is by authenticating the customer's smart card with a smart card issuer.

11. The method of claim 8, wherein the step of authentication of the customer's identification is by cryptographic means.

12. The method of claim 11, wherein the to cryptographic means includes a symmetric or asymmetric key algorithm including one of DSA, DES, hash protocols and digital signatures.

13. The method of claim 8, wherein the step of authentication of the customer's identification is by biometric means.

14. The method of claim 8, wherein the step of authentication of the authority of multiple persons at a single customer is performed by cryptographic means.

15. The method of claim 1, further comprising the step of providing a payment to the seller.

16. The method of claim 15, wherein the step of providing payment to the seller has an automatic payment management system.

17. The method of claim 8, wherein the payment is currency.

18. The method or claim 8, wherein the payment is barter.

19. The method of claim 1, further comprising the step of transferring said shares to the buyer.

20. The method of claim 1, wherein communications between the buyer, intermediary, and the seller is conducted over an electronic network.

21. The method of claim 1 wherein the communication of buyer and seller with the central controller is achieved by the use of software agents.

22. The method of claim 1, wherein communications between the buyer, intermediary, and the seller is conducted over a telecommunications network.

23. The method of claim 1, further including the step of facilitating retrieval of buy or sell orders at said central controller by anyone having access to said central controller.

24. The method of claim 1, wherein said investment company is a mutual fund.

25. The method of claim 1, wherein said investment company is a hedge fund.

26. The method of claim 1, wherein said buy or sell order is created by said intermediary.

27. The method according to claim 1, wherein another buyer or seller stipulates derivatives on said shares.

28. A device having stored programs executable by a computer to perform method steps for facilitating transactions of shares of an investment company between a seller, a buyer, and an intermediate, the method steps comprising:

receiving at the intermediate a sell order to sell in a seconday market shares of an investment company from the seller, binding the seller to said intermediate;

assigning a sell tracking identification corresponding to said sell order and said seller;

assigning said sell order and sell tracking identification in said database;

receiving a buy order from the buyer binding the buyer to said intermediate;

assigning a buy tracking identification to said buy order;

storing said buy order and buy tracking identification in said database;

scanning the database for matching sell and buy orders; executing trade upon a match;

forwarding trade confirmation to a transfer agent; and forwarding confirmations of transaction to the buyer and the seller.

29. A controller having stored programs for facilitating a secondary market transaction of shares of an investment company between a seller, a buyer, and an intermediate, the method steps comprising:

means in said intermediate to act as one of a seller, an intermediate, and a buyer;

means for receiving at the intermediate a sell order to sell in the secondary market shares of an investment company from the seller, binding the seller to said intermediate;

means for assigning a sell tracking identification corresponding to said sell order and said seller;

means for assigning said sell order and sell tracking identification in said database;

means for receiving a buy order from the buyer, binding the buyer to said intermediate;

means for assigning a buy tracking identification to said buy order;

means for storing said buy order and buy tracking identification in said database;

means for scanning the database for matching sell and buy orders;

means for executing trade upon a match;

means for forwarding trade confirmation to a transfer agent; and means for forwarding confirmations of transaction to the buyer and the seller.

* * * * *